US012211443B2

(12) United States Patent
Zhu et al.

(10) Patent No.: US 12,211,443 B2
(45) Date of Patent: Jan. 28, 2025

(54) PIXEL DRIVING CIRCUIT AND DRIVING METHOD THEREOF, DISPLAY SUBSTRATE AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventors: Li Zhu, Beijing (CN); Xilei Cao, Beijing (CN); Zhenhua Zhang, Beijing (CN); Xiaoxin Li, Beijing (CN); Changlong Yuan, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/280,153

(22) PCT Filed: Jul. 29, 2022

(86) PCT No.: PCT/CN2022/108763
§ 371 (c)(1),
(2) Date: Sep. 1, 2023

(87) PCT Pub. No.: WO2023/011327
PCT Pub. Date: Feb. 9, 2023

(65) Prior Publication Data
US 2024/0144880 A1 May 2, 2024

(30) Foreign Application Priority Data
Aug. 5, 2021 (CN) ......................... 202110898571.1

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS

2014/0192037 A1* 7/2014 Chung ................ G09G 3/2022 345/82
2017/0069264 A1* 3/2017 Dai ...................... G09G 3/3233
(Continued)

FOREIGN PATENT DOCUMENTS

CN 103035174 A 4/2013
CN 103456267 A 12/2013
(Continued)

OTHER PUBLICATIONS

China Patent Office, First Office Action dated Nov. 1, 2024, for corresponding Chinese application 202110898571.1.

*Primary Examiner* — Rodney Amadiz
(74) *Attorney, Agent, or Firm* — HOUTTEMAN LAW LLC

(57) ABSTRACT

A pixel driving circuit includes: a data writing circuit, a compensation control circuit, a light emission control circuit, a voltage regulation circuit, a driving transistor, the compensation control circuit is connected with the driving transistor at a first node, the compensation control circuit is connected with the data writing circuit at a second node, the compensation control circuit, the light emission control circuit, the voltage regulation circuit are connected with the driving transistor at a third node; the compensation control circuit obtains a threshold voltage of the driving transistor,
(Continued)

writes a third voltage into the second node, and writes a light emission voltage into the first node according to a variation in a voltage at the second node and the threshold voltage; the voltage regulation circuit maintains a voltage at the third node stable during the compensation control circuit writing the light emission voltage into the first node.

19 Claims, 17 Drawing Sheets

(52) U.S. Cl.
CPC . *G09G 2300/0861* (2013.01); *G09G 2310/08* (2013.01); *G09G 2320/0247* (2013.01); *G09G 2320/0257* (2013.01); *G09G 2320/045* (2013.01)

(58) Field of Classification Search
CPC ....... G09G 2310/08; G09G 2320/0247; G09G 2320/0257; G09G 2320/045; G09G 2300/0417; G09G 2300/0852; G09G 2310/0251; G09G 2320/0214; G09G 2320/0219; G09G 3/32; G09G 3/3225; G09G 3/3258
See application file for complete search history.

(56) References Cited

U.S. PATENT DOCUMENTS

| | | | | |
|---|---|---|---|---|
| 2017/0076670 | A1* | 3/2017 | Chaji | G09G 3/3233 |
| 2017/0263183 | A1* | 9/2017 | Lin | G09G 3/3233 |
| 2021/0035502 | A1* | 2/2021 | Lee | G09G 3/3291 |
| 2023/0024280 | A1* | 1/2023 | Yanase | G09G 3/3241 |
| 2024/0005858 | A1* | 1/2024 | Zhang | G09G 3/3233 |

FOREIGN PATENT DOCUMENTS

| | | | |
|---|---|---|---|
| CN | 104064148 | A | 9/2014 |
| CN | 104217682 | A | 12/2014 |
| CN | 106910468 | A | 6/2017 |
| CN | 108806605 | A | 11/2018 |
| CN | 106847169 | B | 6/2019 |
| CN | 110738964 | A | 1/2020 |
| CN | 111754941 | A | 10/2020 |
| CN | 212010325 | U | 11/2020 |

* cited by examiner

PIXEL DRIVING CIRCUIT AND DRIVING METHOD THEREOF, DISPLAY SUBSTRATE AND DISPLAY DEVICE

TECHNICAL FIELD

The present disclosure relates to the field of display technology, and in particular, to a pixel driving circuit, a driving method of a pixel driving circuit, a display substrate, and a display device.

BACKGROUND

In a case where an existing pixel driving circuit operates in a low frequency state, a threshold voltage of a driving transistor is shifted due to a bias stress, and as the bias stress on the driving transistor varies, the degree of the threshold voltage being shifted also varies, that is, electrical characteristics of the driving transistor are unstable, and in this case, a severe hysteresis effect is generated, so that defects of ghost, flicker and the like are caused.

SUMMARY

In a first aspect, an embodiment of the present disclosure provides a pixel driving circuit, including: a data writing circuit, a compensation control circuit, a light emission control circuit, a voltage regulation circuit and a driving transistor, the compensation control circuit is connected with a gate of the driving transistor at a first node, the compensation control circuit is connected with the data writing circuit at a second node, and the compensation control circuit, the light emission control circuit, the voltage regulation circuit are connected with a second electrode of the driving transistor at a third node;

the data writing circuit is connected with a first control signal terminal and a data line, and is configured to write a data voltage provided by the data line into the second node in response to a control of a signal from the first control signal terminal;

the light emission control circuit is connected with a light emission control signal terminal and a first electrode of a light emitting device, and is configured to control an electrical connection/disconnection of the third node with/from the first electrode of the light emitting device in response to a control of a signal from the light emission control signal terminal;

the compensation control circuit is connected with a second control signal terminal, a third control signal terminal and a third voltage input terminal, and is configured to obtain a threshold voltage of the driving transistor in response to a control of a signal from the second control signal terminal, write a third voltage provided by the third voltage input terminal into the second node in response to a control of a signal from the third control signal terminal, and write a light emission voltage capable of compensating the threshold voltage of the driving transistor into the first node according to a variation in a voltage at the second node and the threshold voltage;

the voltage regulation circuit is configured to maintain a voltage at the third node stable during the compensation control circuit writing the light emission voltage into the first node; and a first electrode of the driving transistor is connected with a first voltage input terminal, and is configured to generate a corresponding driving current according to the light emission voltage.

In some implementations, the voltage regulation circuit includes a fifth transistor, and a control electrode of the fifth transistor is connected to a fourth control signal terminal, a first electrode of the fifth transistor is connected to the third node, and a second electrode of the fifth transistor is connected to a third voltage input terminal.

In some implementations, the voltage regulation circuit includes a voltage regulation capacitor;

a first terminal of the voltage regulation capacitor is connected with the third node, and a second terminal of the voltage regulation capacitor is connected with a fourth voltage input terminal.

In some implementations, the fourth voltage input terminal is common to the light emission control signal terminal.

In some implementations, the data writing circuit includes a first transistor;

a control electrode of the first transistor is connected to the first control signal terminal, a first electrode of the first transistor is connected to the data line, and a second electrode of the first transistor is connected to the second node.

In some implementations, the first transistor is a double-gate type low temperature polysilicon transistor.

In some implementations, the reset compensation circuit includes: a second transistor, a third transistor and a coupling capacitor;

a control electrode of the second transistor is connected with the second control signal terminal, a first electrode of the second transistor is connected with the first node, and a second electrode of the second transistor is connected with the third node;

a control electrode of the third transistor is connected to the third control signal terminal, a first electrode of the third transistor is connected to the third voltage input terminal, and a second electrode of the third transistor is connected to the second node; and a first terminal of the coupling capacitor is connected with the first node, and a second terminal of the coupling capacitor is connected with the second node.

In some implementations, the data writing circuit includes a first transistor;

a control electrode of the first transistor is connected with the first control signal terminal, a first electrode of the first transistor is connected with the data line, and a second electrode of the first transistor is connected with the second node;

the first transistor is a low temperature polysilicon transistor, and the third transistor is an oxide transistor; and the first control signal terminal and the third control signal terminal are common to each other.

In some implementations, the pixel driving circuit further includes: a first reset circuit, the first reset circuit includes a sixth transistor;

a control electrode of the sixth transistor is connected with a fifth control signal terminal, a first electrode of the sixth transistor is connected to the first electrode of the light emitting device, and a second electrode of the sixth transistor is connected to the third voltage input terminal;

the second transistor and the sixth transistor are both low temperature polysilicon transistors or both oxide transistors; and the second control signal terminal and the fifth control signal terminal are common to each other.

In some implementations, the first transistor is a double-gate type low temperature polysilicon transistor.

In some implementations, the light emission control circuit includes a fourth transistor;

a control electrode of the fourth transistor is connected to the light emission control signal terminal, a first electrode of the fourth transistor is connected to the third node, and a second electrode of the fourth transistor is connected to the first electrode of the light emitting device.

In some implementations, the pixel driving circuit further includes: a first reset circuit, the first reset circuit is connected to a fifth control signal terminal, the third voltage input terminal, and the first electrode of the light emitting device, and is configured to write a third voltage supplied from the third voltage input terminal into the first electrode of the light emitting device in response to a control of a signal from the fifth control signal terminal.

In some implementations, the first reset circuit includes a sixth transistor, and a control electrode of the sixth transistor is connected to the fifth control signal terminal, a first electrode of the sixth transistor is connected to the first electrode of the light emitting device, and a second electrode of the sixth transistor is connected to the third voltage input terminal.

In some implementations, the pixel driving circuit further includes: a second reset circuit, the second reset circuit is connected to a sixth control signal terminal, the third voltage input terminal, and the first node, and is configured to write the third voltage provided from the third voltage input terminal into the first node in response to a control of a signal from the sixth control signal terminal.

In some implementations, the second reset circuit includes a seventh transistor, a control electrode of the seventh transistor is connected to the sixth control signal terminal, a first electrode of the seventh transistor is connected to the third voltage input terminal, and a second electrode of the seventh transistor is connected to the first node.

In some implementations, the seventh transistor is an oxide transistor.

In a second aspect, an embodiment of the present disclosure further provides a driving method of the pixel driving circuit provided in the first aspect, and the driving method includes:

a compensation stage, in which the data writing circuit writes a data voltage provided by the data line into the second node in response to a control of a signal from the first control signal terminal, and the compensation control circuit obtains a threshold voltage of the driving transistor in response to a control of a signal from the second control signal terminal;

a light emission voltage writing stage, in which the compensation control circuit writes a third voltage provided by the third voltage input terminal into the second node in response to a control of a signal from the third control signal terminal, and writes a light emission voltage capable of compensating the threshold voltage of the driving transistor into the first node according to a variation in a voltage at the second node and the threshold voltage, and the voltage regulation circuit maintains the voltage at the third node stable; and a light emission stage, in which the light emission control circuit electrically connect/disconnect the third node with/from a first electrode of a light emitting device in response to a control of a signal from the light emitting control signal terminal, and the driving transistor generates a corresponding driving current according to the light emission voltage so as to drive the light emitting device to emit light.

In a third aspect, an embodiment of the present disclosure further provides a display substrate, including the pixel drive circuit as provided in the second aspect above.

In a fourth aspect, an embodiment of the present disclosure further provides a display device, including the display substrate as provided in the third aspect above.

DETAIL DESCRIPTION OF EMBODIMENTS

Figure 1:
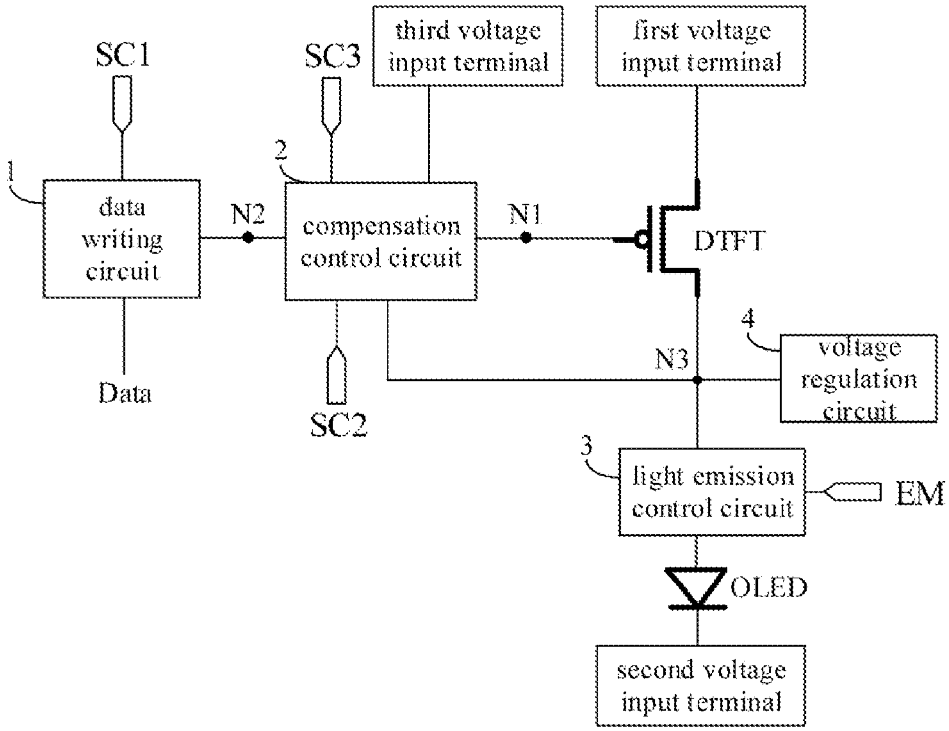
FIG. 1 is a schematic structural diagram of a pixel driving circuit according to an embodiment of the present disclosure.

In order to make those skilled in the art better understand the technical solutions of the present disclosure, a pixel driving circuit, a driving method of a pixel driving circuit, a display substrate and a display device provided in the present disclosure are described in detail below with reference to the accompanying drawings.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. The embodiments and features of the embodiments in the present disclosure may be combined with each other without conflict. All other embodiments, which can be derived by a person skilled in the art from the described embodiments of the disclosure without any creative effort, are within the protection scope of the present disclosure.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. The word "comprising/comprise" or "including/includes", and the like, means that the element or item preceding the word includes the element or item listed after the word and its equivalent, but does not exclude other elements or items. The terms "connected/connecting" or "coupled/coupling" and the like are not restricted to physical or mechanical connections, but may include electrical connections, whether direct or indirect.

It should be noted that the transistors used in the embodiments of the present disclosure may be thin film transistors or field effect transistors or other devices with the same and similar characteristics, and since a source and a drain of the transistor used are symmetrical, there is no difference between the source and the drain. In the embodiments of the present disclosure, to distinguish the source and the drain of the transistor, one of the source or the drain is referred to as a first electrode, the other one of the source or the drain is referred to as a second electrode, and a gate of the transistor is referred to as a control electrode. In addition, the transistors may be divided into N-type and P-type according to the characteristics of the transistors, when a P-type transistor is adopted, the first electrode is the source of the P-type transistor, the second electrode is the drain of the P-type transistor, and the situation is opposite for the N-type transistor. An "active level" in the present disclosure refers to a level that can control the corresponding transistor to be turned on; specifically, for a P-type transistor, the active level corresponding thereto is a low level; for an N-type transistor, the active level corresponding thereto is a high level.

An operation process of the pixel driving circuit with an internal compensation function is substantially as follows: in a compensation stage, acquiring the threshold voltage of the driving transistor; in a light emission voltage writing stage, generating a light emission voltage capable of compensating the threshold voltage of the driving transistor according to a data voltage and the threshold voltage of the driving transistor, and writing the light emission voltage into a gate of the driving transistor; in a light emission stage, a drain of the driving transistor is electrically connected with the light emitting device to enable the driving transistor to output a driving current to the light emitting device.

In the related art, in the process of writing the light emission voltage into the driving transistor (i.e., in a light emission voltage writing stage), the drain of the driving transistor is generally in a floating state; due to a parasitic capacitance between the gate and the drain of the driving transistor, a voltage at the drain of the driving transistor changes accordingly during writing the light emission voltage into the driving transistor. The change of the voltage at the drain of the driving transistor may cause the bias stress applied to the driving transistor to be inconsistent, and the threshold voltage of the driving transistor may be shifted seriously, so that a serious hysteresis effect is generated, and further, defects of ghost, flicker and the like are caused.

To solve at least one of the technical problems in the related art, the embodiments of the present disclosure provide corresponding solutions.

A light emitting device in the present disclosure refers to a current-driven light emitting element including an Organic Light Emitting Diode (OLED), a Light Emitting Diode (LED), and the like. In the embodiments of the present disclosure, the light emitting device being an OLED will be described as an example, the first electrode and the second electrode of the light emitting device refer to an anode and a cathode, respectively.

FIG. 1 is a schematic structural diagram of a pixel driving circuit according to an embodiment of the present disclosure, and as shown in FIG. 1, the pixel driving circuit includes: a data writing circuit 1, a compensation control circuit 2, a light emission control circuit 3, a voltage regulation circuit 4 and a driving transistor DTFT. The compensation control circuit 2 and a gate of the driving transistor DTFT are connected at a first node N1, the compensation control circuit 2 and the data writing circuit 1 are connected at a second node N2, and the compensation control circuit 2, the light emission control circuit 3, the voltage regulation circuit 4 and a second electrode of the driving transistor DTFT are connected at a third node N3.

The data writing circuit 1 is connected with a first control signal terminal SC1 and a data line Data, and the data writing circuit 1 is configured to write a data voltage provided by the data line Data into the second node N2 under the control of a signal of the first control signal terminal SC1.

The light emission control circuit 3 is connected with a light emission control signal terminal EM and a first electrode of a light-emitting device OLED, and the light emission control circuit 3 is configured to electrically connect/disconnect the third node N3 with/from the first electrode of the light-emitting device OLED in response to the control of a signal of the light emission control signal terminal EM.

The compensation control circuit 2 is connected with a second control signal terminal SC2, a third control signal terminal SC3 and a third voltage input terminal, and the compensation control circuit 2 is configured to obtain a threshold voltage of the driving transistor DTFT in response to the control of a signal of the second control signal terminal SC2, write a third voltage supplied from the third voltage input terminal into the second node N2 in response to the control of a signal of the third control signal terminal SC3, and write a light emission voltage capable of compensating the threshold voltage of the driving transistor DTFT to the first node N1 according to a variation of a voltage at the second node N2 and the threshold voltage.

The voltage regulation circuit 4 is configured to maintain a voltage at the third node N3 stable during the compensation control circuit 2 writing the light emission voltage into the first node N1.

A first electrode of the driving transistor DTFT is connected with a first voltage input terminal, and the driving transistor DTFT is configured to generate a corresponding driving current according to the light emission voltage.

In the embodiment of the present disclosure, the voltage regulation circuit 4 is provided at the third node N3 in the pixel driving circuit, so that the voltage regulation circuit 4 can weaken, even completely eliminate, the influence of a parasitic capacitance between the gate and the drain of the driving transistor DTFT on the voltage at the drain of the driving transistor DTFT during the process of writing the light emission voltage into the gate of the driving transistor DTFT by the compensation control circuit 2, so as to maintain the voltage at the third node N3 to be stable, thus the bias stress applied to the driving transistor DTFT is substantially contant, and the threshold voltage of the driving transistor DTFT is substantially kept stable, therefore, the influence of the hysteresis effect can be weakened, and further, the problems of ghost, flicker and the like of the display device can be effectively improved.

Figure 2:
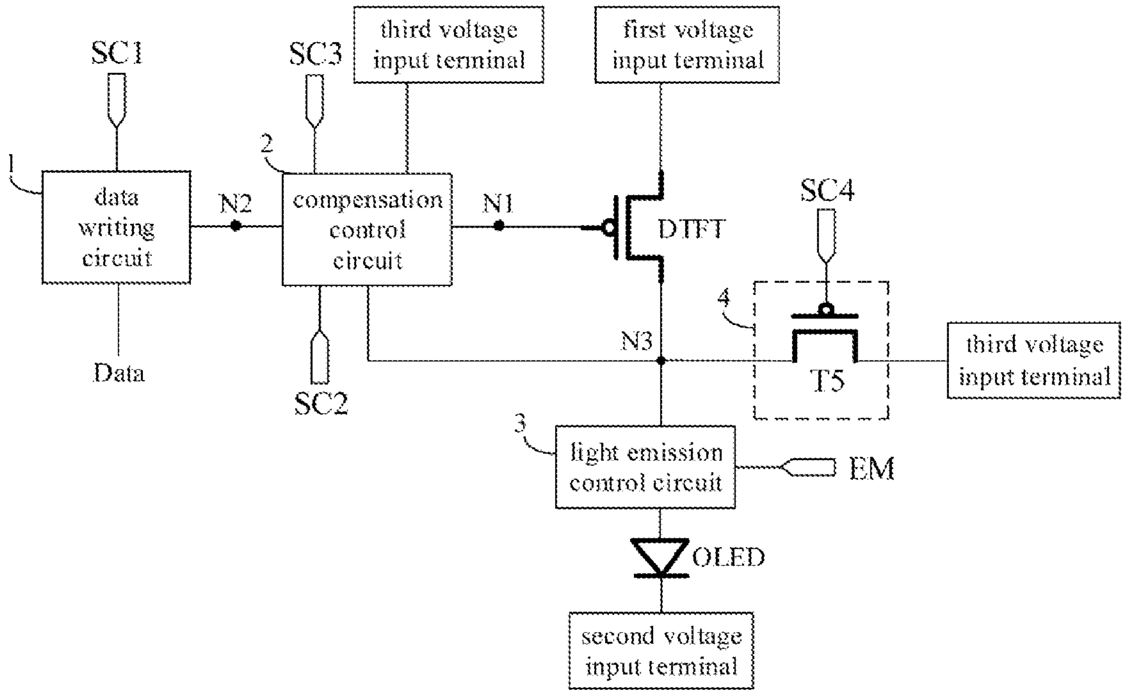
FIG. 2 is a schematic structural diagram of a pixel driving circuit according to an embodiment of the present disclosure.

FIG. 2 is a schematic structural diagram of a pixel driving circuit provided in an embodiment of the present disclosure, and as shown in FIG. 2, in some implementations, the voltage regulation circuit 4 includes a fifth transistor T5, a control electrode of the fifth transistor T5 is connected to a fourth control signal terminal SC4, a first electrode of the fifth transistor T5 is connected to the third node N3, and a second electrode of the fifth transistor T5 is connected to a third voltage input terminal.

In the process that the compensation control circuit 2 writes the light emission voltage into the gate of the driving transistor DTFT, the fifth transistor T5 is controlled to be turned on by a signal from the fourth control signal terminal SC4, so that a third voltage (which is a constant voltage at least in a light emission voltage writing stage) provided by the third voltage input terminal is written into the third node N3; that is, in the light emission voltage writing stage, the voltage at the third node N3 is always the third voltage, and the voltage regulation circuit 4 in the embodiment of the present disclosure can completely eliminate the influence of the parasitic capacitance between the gate and the drain of the driving transistor DTFT on the voltage at the drain of the driving transistor DTFT in the light emission voltage writing stage.

Figure 3A:
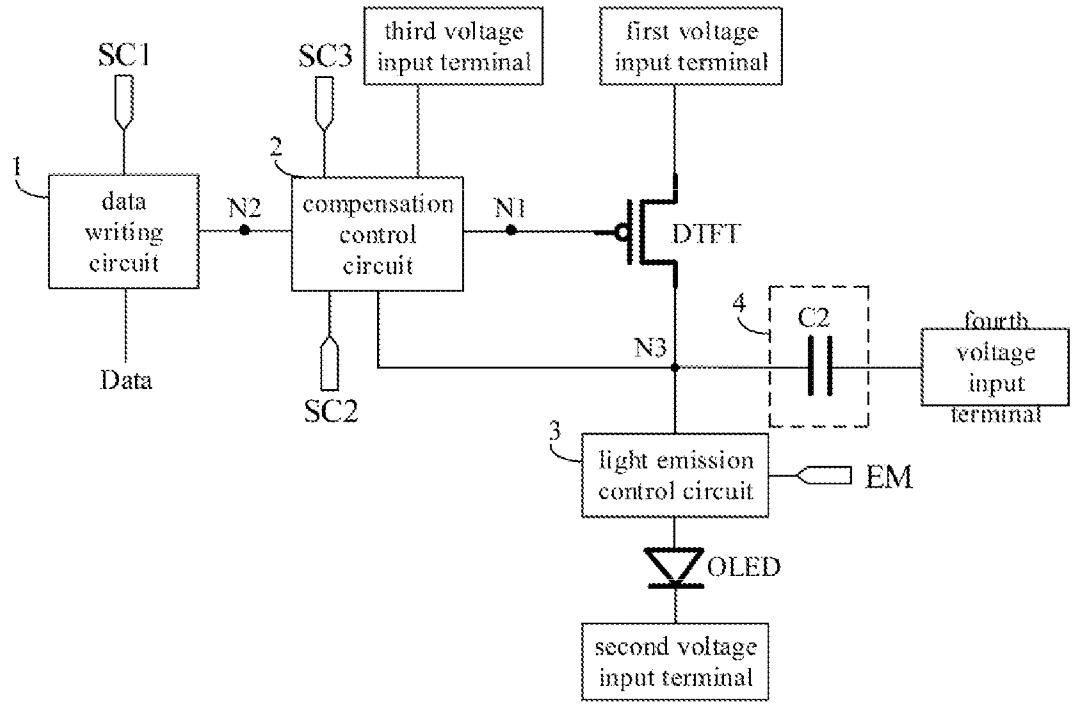
FIG. 3*a* is a schematic structural diagram of a pixel driving circuit according to an embodiment of the present disclosure.

FIG. 3*a* is a schematic structural diagram of a pixel driving circuit according to an embodiment of the present disclosure, and as shown in FIG. 3*a*, unlike the case where the voltage regulation circuit 4 shown in FIG. 2 includes the fifth transistor T5, the voltage regulation circuit 4 in the embodiment shown in FIG. 3*a* includes a voltage regulation capacitor C2, a first terminal of the voltage regulation capacitor C2 is connected to the third node N3, and a second terminal of the voltage regulation capacitor C2 is connected to a fourth voltage input terminal. A fourth voltage provided by the fourth voltage input terminal is a constant voltage at least in the light emission voltage writing stage.

In the embodiment of the present disclosure, by providing the voltage regulation capacitor C2 at the third node N3, the influence of the parasitic capacitance between the gate and the drain of the driving transistor DTFT on the voltage at the third node N3 can be effectively weakened, so that the voltage at the third node N3 only changes slightly or remains substantially unchanged in the light emission voltage writing stage. That is, in the light emission voltage writing stage, the voltage regulation circuit 4 in the embodiment of the present disclosure can completely and effectively improve the influence of the parasitic capacitance between the gate and the drain of the driving transistor DTFT on the voltage at the drain of the driving transistor DTFT.

Figure 3B:
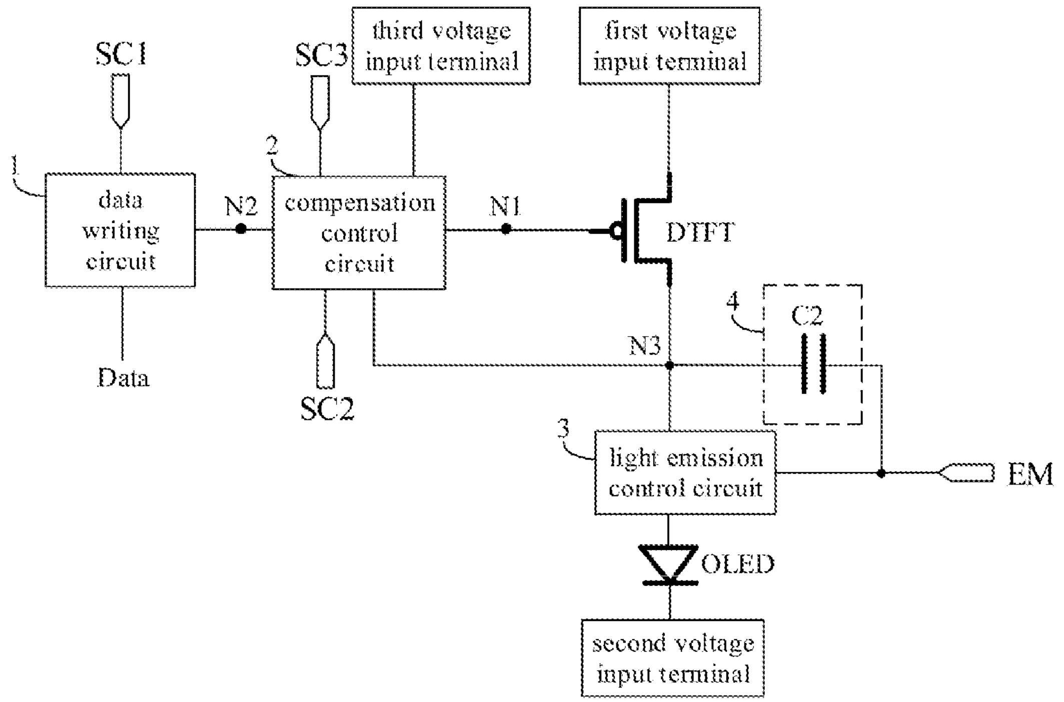
FIG. 3*b* is a schematic structural diagram of a pixel driving circuit according to an embodiment of the present disclosure.

FIG. 3*b* is a schematic structural diagram of a pixel driving circuit according to an embodiment of the present disclosure, as shown in FIG. 3*b*, in some implementations, the fourth voltage input terminal connected to the second terminal of the voltage regulation capacitor C2 is common to the light emission control signal terminal EM. That is, the second terminal of the voltage regulation capacitor C2 can be directly connected to the light emission control signal terminal EM of the light emission control circuit 3.

In the above design of connecting the second terminal of the voltage regulation capacitor C2 with the light emission control signal terminal EM, on one hand, the number of signals required to be configured for the pixel driving circuit can be effectively reduced, which is beneficial to simplifying the product design; on the other hand, since the voltage regulation capacitor C2 is relatively close to the light emission control circuit 3, the connection between the second terminal of the voltage regulation capacitor C2 and the light emission control signal terminal EM is easy to be realized in an actual product.

Figure 4:
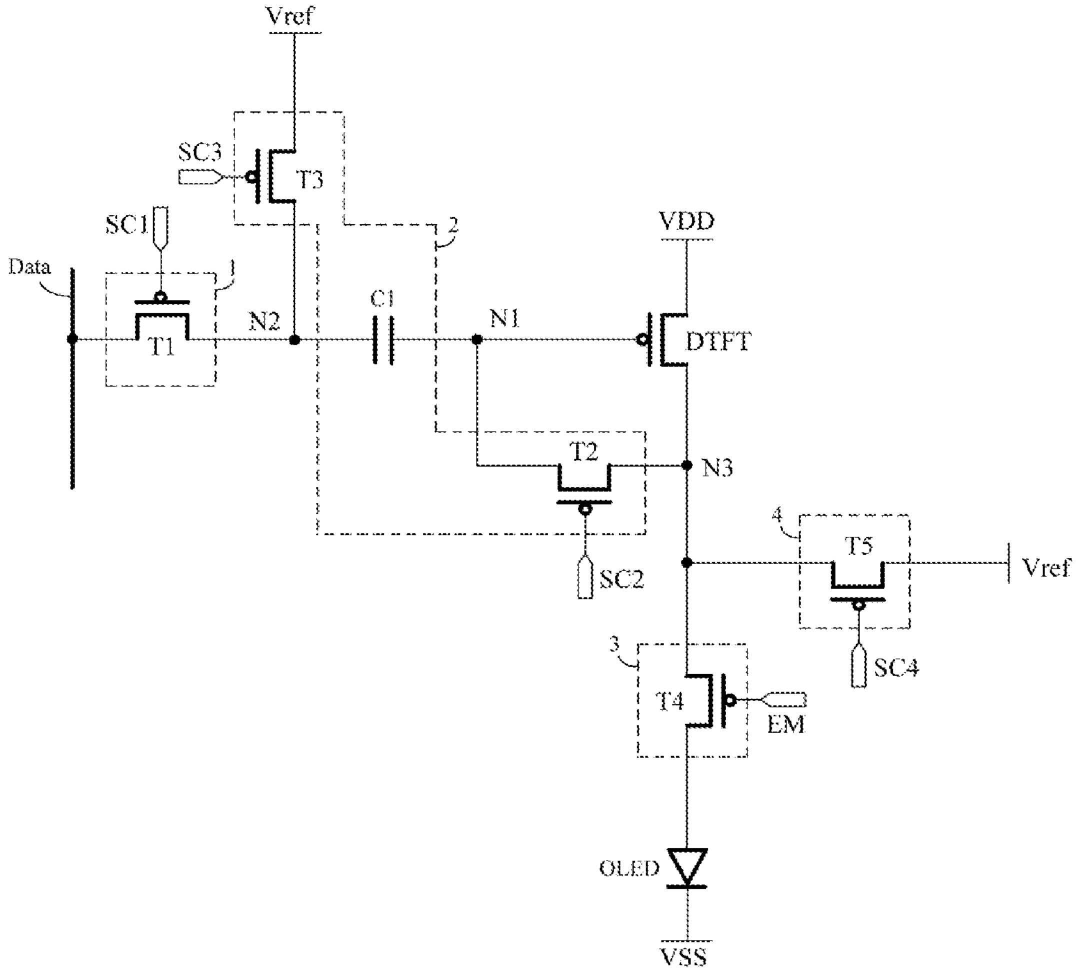
FIG. 4 is a schematic structural diagram of a pixel driving circuit according to an embodiment of the present disclosure.

FIG. 4 is a schematic structural diagram of a pixel driving circuit provided in an embodiment of the present disclosure, as shown in FIG. 4, in some implementations, the data writing circuit 1 includes a first transistor T1, a control electrode of the first transistor T1 is connected to the first control signal terminal SC1, a first electrode of the first transistor T1 is connected to the data line Data, and a second electrode of the first transistor T1 is connected to the second node N2.

In some implementations, the compensation control circuit includes: a second transistor T2, a third transistor T3 and a coupling capacitor C1. A control electrode of the second transistor T2 is connected to the second control signal terminal SC2, a first electrode of the second transistor T2 is connected to the first node N1, and a second electrode of the second transistor T2 is connected to the third node N3. A control electrode of the third transistor T3 is connected to the third control signal terminal SC3, a first electrode of the third transistor T3 is connected to the third voltage input terminal, and a second electrode of the third transistor T3 is connected to the second node N2. A first terminal of the coupling capacitor C1 is connected to the first node N1, and a second terminal of the coupling capacitor C1 is connected to the second node N2.

In some implementations, the light emission control circuit 3 includes a fourth transistor T4, a control electrode of the fourth transistor T4 is connected to the light emission control signal terminal EM, a first electrode of the fourth transistor T4 is connected to the third node N3, and a second electrode of the fourth transistor T4 is connected to the first electrode of the light emitting device OLED.

The detailed operation of the pixel driving circuit shown in FIG. 4 will be described in detail with reference to the accompanying drawings. FIG. 4 illustrates a case where all the transistors in the pixel driving circuit are P-type transistors, for example, all the transistors in the pixel driving circuit are Low Temperature Polysilicon (LTPS) transistors. The first voltage input terminal provides a first voltage VDD, the second voltage input terminal provides a second voltage VSS, and the third voltage input terminal provides a third voltage Vref. The third voltage Vref may be equal to the first voltage VDD or slightly less than the first voltage VDD.

Figure 5:
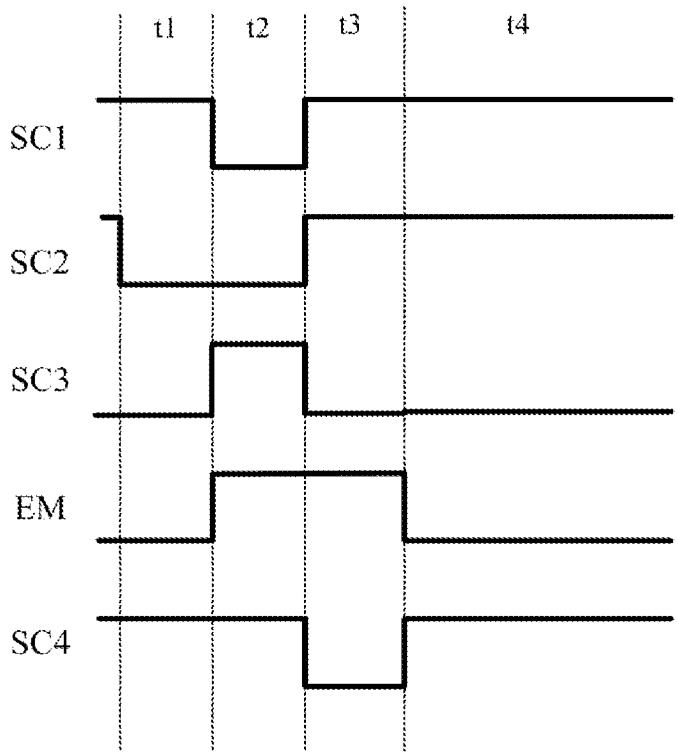
FIG. 5 is a timing diagram illustrating an operation of the pixel driving circuit shown in FIG. 4.

FIG. 5 is a timing diagram illustrating an operation of the pixel driving circuit shown in FIG. 4, and as shown in FIG. 5, the operation of the pixel driving circuit shown in FIG. 4 may include the following stages, that is, a reset stage t1, a compensation stage t2, a light emission voltage writing stage t3 and a light emission stage t4.

In the reset stage t1, a signal provided by the first control signal terminal SC1 is at a high level, a signal provided by the second control signal terminal SC2 is at a low level, a signal provided by the third control signal terminal SC3 is at a low level, a signal provided by the light emission control signal terminal EM is at a low level, and a signal provided by the fourth control signal terminal SC4 is at a high level. In this case, the second transistor T2, the third transistor T3, and the fourth transistor T4 are all turned on, and the first transistor T1 and the fifth transistor T5 are all turned off.

The third voltage Vref is written into the second node N2 through the third transistor T3 to reset the second node N2; a voltage VSS+Voled at the first electrode of the light emitting device OLED is written into the first node N1 through the fourth transistor T4 and the second transistor T2 to reset the first node N1; Voled is a voltage for turning on the light emitting device OLED (the magnitude of Voled varies with an operation state of the light emitting device OLED).

In the compensation stage t2, the signal provided by the first control signal terminal SC1 is at a low level, the signal provided by the second control signal terminal SC2 is at a low level, the signal provided by the third control signal terminal SC3 is at a high level, the signal provided by the light emission control signal terminal EM is at a high level, and the signal provided by the fourth control signal terminal SC4 is at a high level. In this case, the first transistor T1 and the second transistor T2 are all turned on, and the third transistor T3, the fourth transistor T4 and the fifth transistor T5 are all turned off.

The data voltage Vdata is written into the second node N2 through the first transistor T1; the first node N1 is charged by the first voltage VDD through the driving transistor DTFT and the second transistor T2, in a case where the voltage at the first node N1 is equal to VDD+Vth, the driving transistor DTFT is turned off, and the charging is finished; Vth is the threshold voltage of the driving transistor DTFT. In this case, a voltage difference between two terminals of the coupling capacitor C1 is equal to VDD+Vth−Vdata.

In the light emission voltage writing stage t3, the signal provided by the first control signal terminal SC1 is at a high level, the signal provided by the second control signal terminal SC2 is at a high level, the signal provided by the third control signal terminal SC3 is at a low level, the signal provided by the light emission control signal terminal EM is at a high level, and the signal provided by the fourth control signal terminal SC4 is at a low level. In this case, the third transistor T3 and the fifth transistor T5 are all turned on, and the first transistor T1, the second transistor T2 and the fourth transistor T4 are all turned off.

The second transistor T2 is turned off, and the first node N1 is in a floating state. The third voltage Vref is written into the second node N2 through the third transistor T3, the voltage at the second node N2 is changed from Vdata to Vref, and under the bootstrap action of the coupling capacitor C1, the voltage at the first node N1 is changed from VDD+Vth to VDD+Vth+Vref−Vdata. That is, the light emission voltage of VDD+Vth+Vref−Vdata is written into the first node N1.

In the process of writing the light emission voltage into the first node N1, since the fifth transistor T5 is turned on, the third voltage Vref is written into the third node N3 through the fifth transistor T5, the voltage at the third node N3 is always maintained at Vref, that is, the bias stress applied to the driving transistor DTFT is substantially constant, the threshold voltage of the driving transistor DTFT is substantially kept stable, and the influence of the hysteresis effect can be reduced.

In the light emission stage t4, the signal provided by the first control signal terminal SC1 is at a high level, the signal provided by the second control signal terminal SC2 is at a high level, the signal provided by the third control signal terminal SC3 is at a low level, the signal provided by the light emission control signal terminal EM is at a low level, and the signal provided by the fourth control signal terminal SC4 is at a high level. In this case, the third transistor T3 and the fourth transistor T4 are all turned on, and the first transistor T1, the second transistor T2 and the fifth transistor T5 are all turned off.

The third transistor T3 continuously writes the third voltage Vref into the second node N2 to maintain the voltage at the second node N2 stable, which is beneficial to maintaining the voltage at the first node N1 stable; meanwhile, the driving transistor DTFT outputs a driving current I according to its own gate-source voltage Vgs, Vgs=VDD+Vth+Vref−Vdata−VDD=Vth+Vref−Vdata; and the following formula can be obtained based on a saturated driving current formula of the driving transistor DTFT:

$$\begin{aligned} I &= K*(Vgs-Vth)^2 \\ &= K*(Vth+Vref-Vdata-Vth)^2. \\ &= K*(Vref-Vdata)^2 \end{aligned}$$

K is a constant (a magnitude of K is related to electrical characteristics of the driving transistor DTFT). As can be seen from the above formula, the driving current I output by the driving transistor DTFT is only related to the data voltage Vdata and the third voltage Vref, but is not related to the threshold voltage Vth of the driving transistor DTFT, so that the driving current flowing through the light emitting device OLED is prevented from being affected by non-uniformity and drift of the threshold voltage, and the uniformity of the driving current flowing through the light emitting device OLED is effectively improved.

It should be noted that, in some implementaions, the process of the reset stage may not be performed; that is, the operation process of the pixel driving circuit includes only the compensation stage t2, the light emission voltage writing stage t3 and the light emission stage t4.

Figure 6:
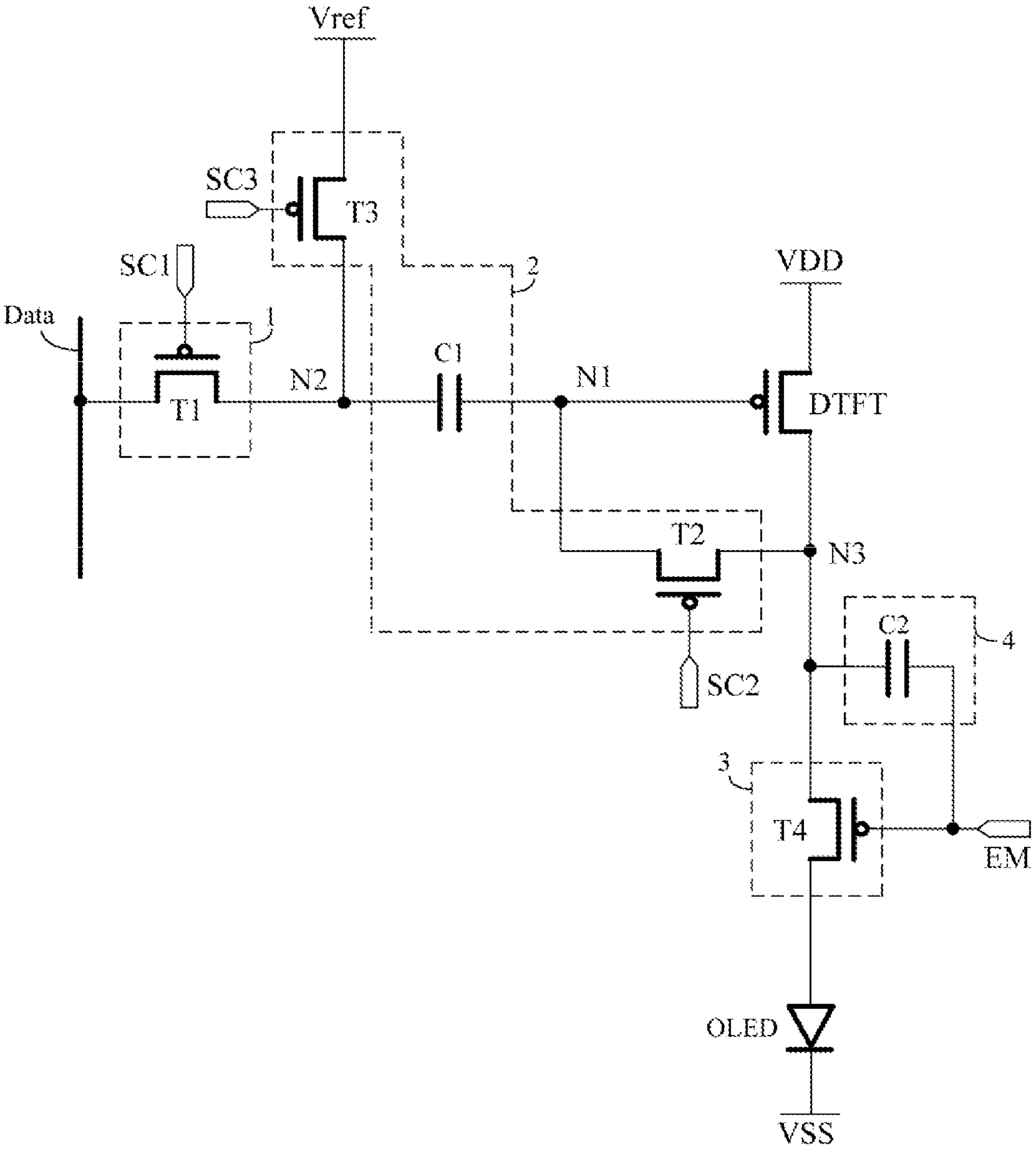
FIG. 6 is a schematic structural diagram of a pixel driving circuit according to an embodiment of the present disclosure.

It should be noted that FIG. 4 illustrates a case where the voltage regulation circuit 4 includes the fifth transistor T5. FIG. 6 is a schematic structural diagram of a pixel driving circuit according to an embodiment of the present disclosure, and as shown in FIG. 6, specific circuit structures of the data writing circuit 1, the compensation control circuit 2 and the light emission control circuit 3 in FIG. 6 are the same as those in FIG. 4, but the voltage regulation circuit 4 in FIG. 6 includes a voltage regulation capacitor C2. FIG. 6 shows only an example in which a second terminal of the voltage regulation capacitor C2 is connected to the light emission control signal terminal EM.

The timing of an operation of the pixel driving circuit shown in FIG. 6 may also be the same as that shown in FIG. 5, and the detailed process thereof is not described herein again.

Figure 7:
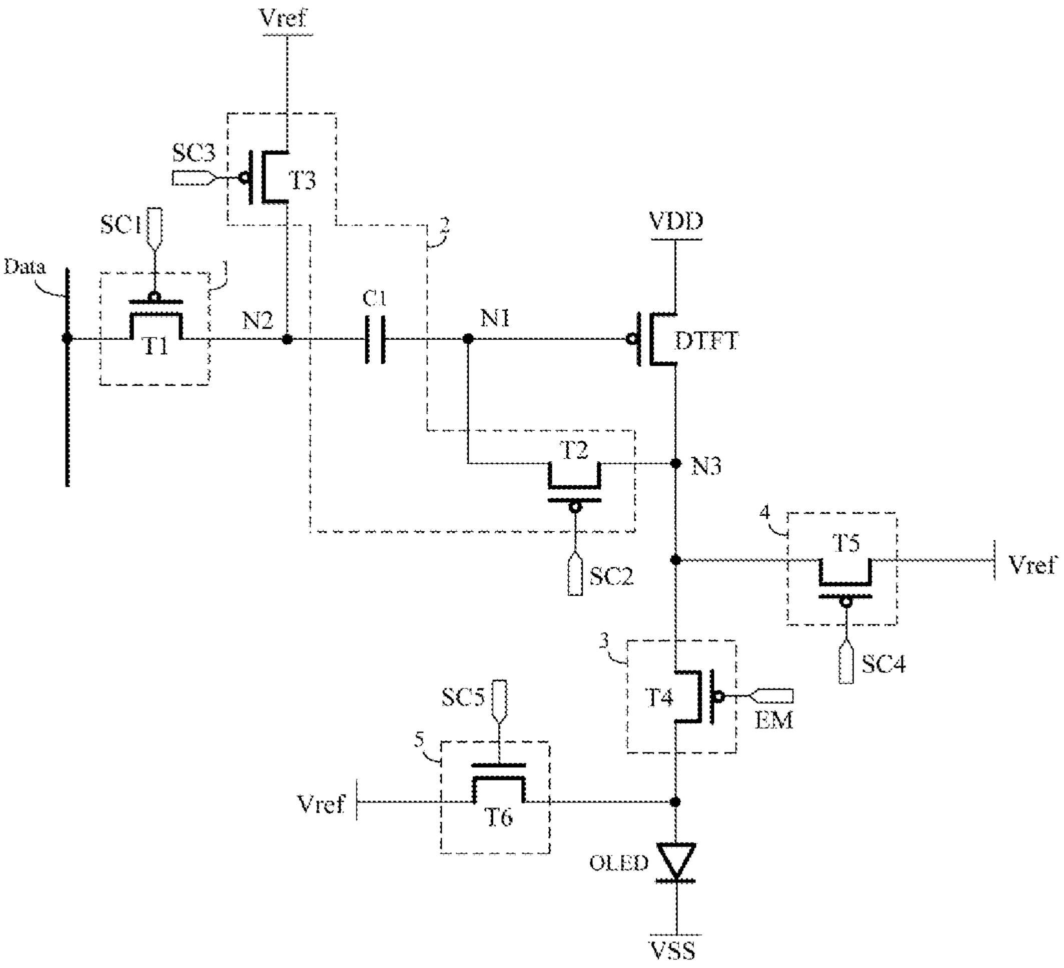
FIG. 7 is a schematic structural diagram of a pixel driving circuit according to an embodiment of the present disclosure.
Figure 8:
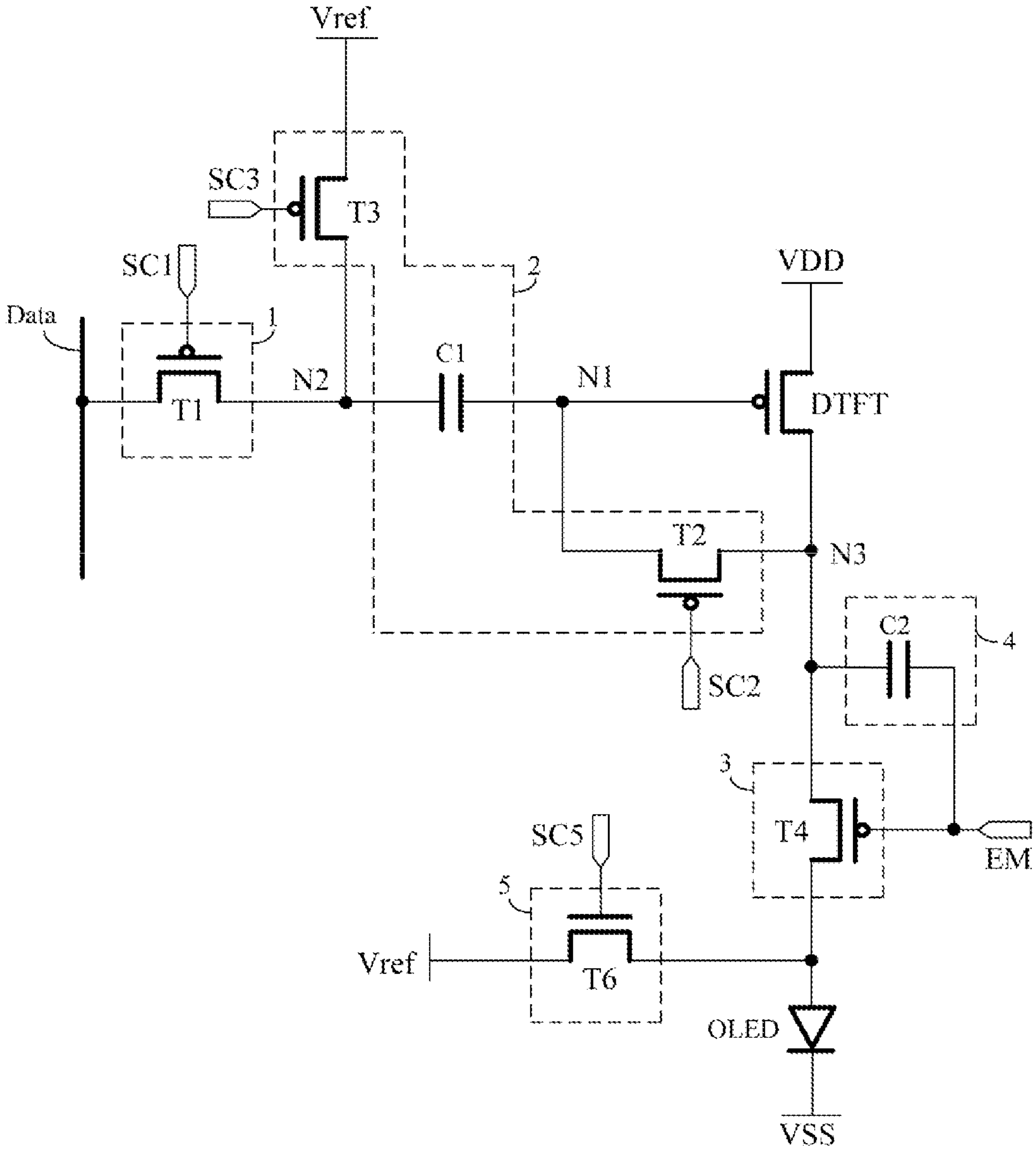
FIG. 8 is a schematic structural diagram of a pixel driving circuit according to an embodiment of the present disclosure.

FIG. 7 is a schematic structrual diagram of a pixel driving circuit according to an embodiment of the present disclosure, and FIG. 8 is a schematic structural diagram of a pixel driving circuit according to an embodiment of the present disclosure, as shown in FIG. 7 and FIG. 8, in some implementations, the pixel driving circuit includes not only the data writing circuit 1, the compensation control circuit 2, the light emission control circuit 3, and the voltage regulation circuit 4, but also a first reset circuit 5.

The first reset circuit 5 is connected with a fifth control signal terminal SC5, the third voltage input terminal and the first electrode of the light emitting device OLED, and is configured to write the third voltage provided from the third voltage input terminal into the first electrode of the light emitting device OLED in response to the control of a signal from the fifth control signal terminal SC5. In the embodiment of the present disclosure, by providing the first reset circuit 5, the first electrode of the light emitting device OLED can be reset in the reset stage.

In some implementations, the first reset circuit 5 includes, a sixth transistor T6, a control electrode of the sixth transistor T6 is connected to the fifth control signal terminal SC5, a first electrode of the sixth transistor T6 is connected to the first electrode of the light emitting device OLED, and a second electrode of the sixth transistor T6 is connected to the third voltage input terminal.

Figure 9:
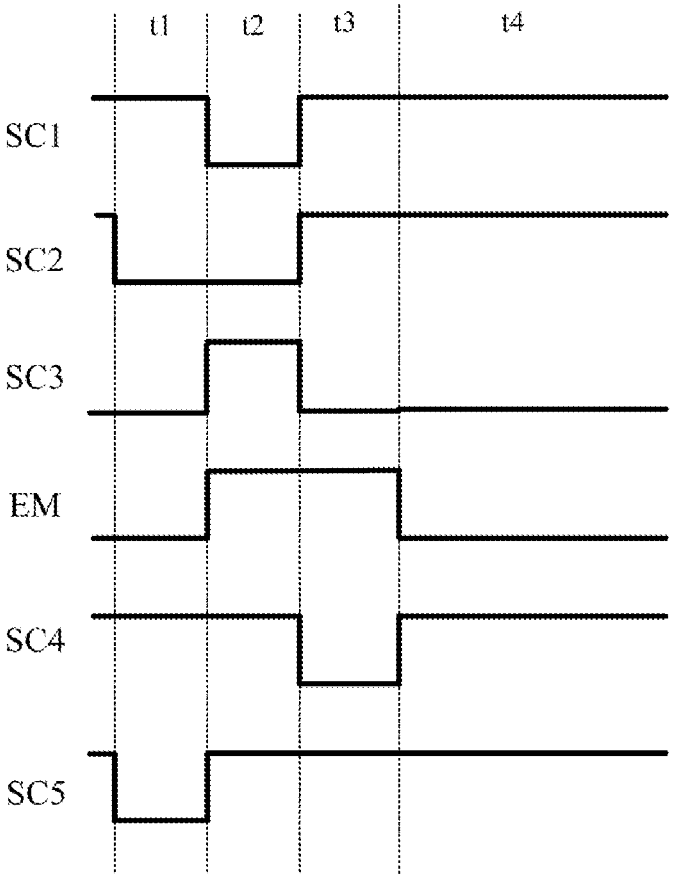
FIG. 9 is a timing diagram illustrating an operation of the pixel driving circuit shown in FIG. 7.

FIG. 9 is a timing diagram illustrating an operation of the pixel driving circuit shown in FIG. 7, and as shown in FIG. 9, the operation of the pixel driving circuit shown in FIG. 7 may include: a reset stage t1, a compensation stage t2, a light emission voltage writing stage t3 and a light emission stage t4. The operation timings of the first control signal terminal SC1, the second control signal terminal SC2, the third control signal terminal SC3, the light emission control signal terminal EM, and the fourth control signal terminal SC4 shown in FIG. 9 are the same as those shown in FIG. 5, and only an operation timing of the fifth control signal terminal SC5 at each stage will be described in detail below.

In the reset stage t1, a signal provided by the fifth control signal terminal SC5 is at a low level, the sixth transistor T6 is turned on, and the third operation voltage Vref is written into the first electrode of the light emitting device OLED through the sixth transistor T6, so as to reset the first electrode of the light emitting device OLED. Meanwhile, the third operation voltage Vref may be written into the first node N1 through the fourth transistor T4 and the second transistor T2 to reset the first node N1. In the compensation stage t2, the light emission voltage writing stage T3 and the light emission stage T4, the fifth control signal terminal SC5 provides a low level signal, and the sixth transistor T6 is turned off.

It should be noted that, in some implementations, the fifth control signal terminal SC5 in FIG. 9 may also provide a low level during the compensation stage t2 and/or the light emission voltage writing stage t3 to continuously reset the first electrode of the light emitting device OLED, which also falls within the protective scope of the present disclosure.

Figure 10:
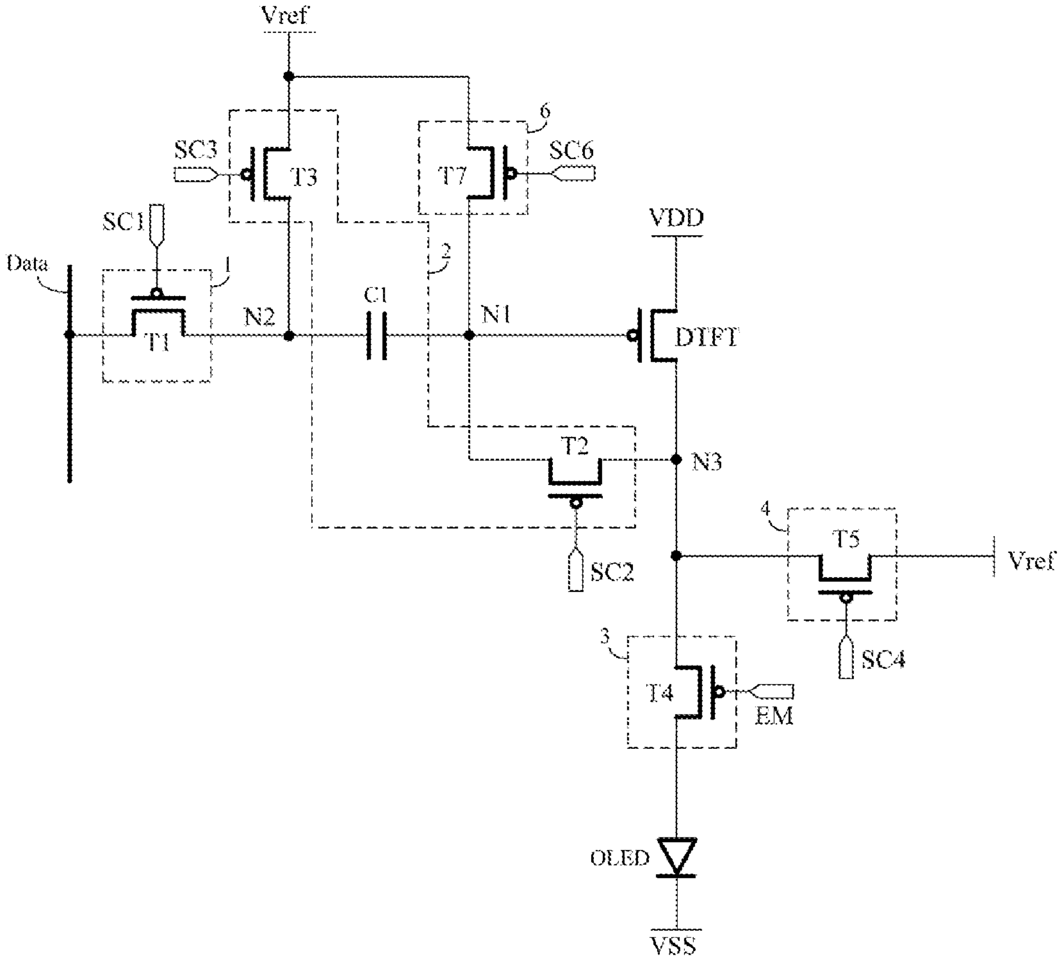
FIG. 10 is a schematic structural diagram of a pixel driving circuit according to an embodiment of the present disclosure.
Figure 11:
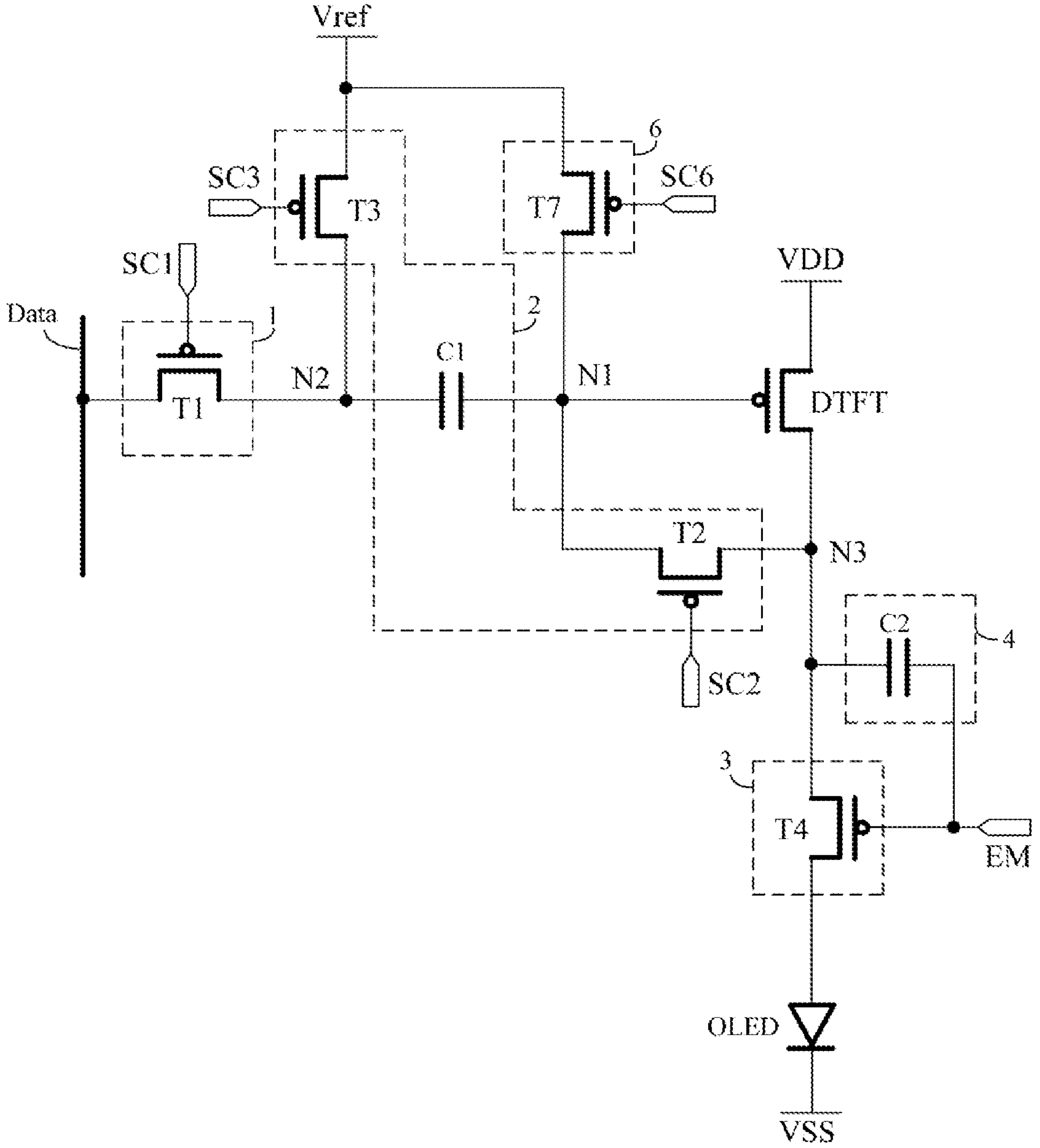
FIG. 11 is a schematic structural diagram of a pixel driving circuit according to an embodiment of the present disclosure.

FIG. 10 is a schematic strutural diagram of a pixel driving circuit according to an embodiment of the present disclosure, and FIG. 11 is a schematic structural diagram of a pixel driving circuit according to an embodiment of the present disclosure, as shown in FIG. 10 and FIG. 11, in some implementations, the pixel driving circuit includes not only the data writing circuit 1, the compensation control circuit 2, the light emission control circuit 3, and the voltage regulation circuit 4, but also a second reset circuit 6.

The second reset circuit 6 is connected with a sixth control signal terminal SC6, the third voltage input terminal, and the first node N1, and the second reset circuit 6 is configured to write the third voltage supplied from the third voltage input terminal into the first node N1 in response to the control of a signal from the sixth control signal terminal SC6. In the embodiment of the present disclosure, by providing the second reset circuit 6, the first node N1 can be reset in the reset stage, and in this case, it is unnecessary to reset the first node N1 by using the voltage at the first electrode of the light emitting device OLED, and accordingly, it is unnecessary for the light emission control circuit 3 to electrically connect the third node N3 with the first electrode of the light emitting device OLED and allow a current therebetween in the reset stage.

In some implementations, the second reset circuit 6 includes a seventh transistor T7, a control electrode of the seventh transistor T7 is connected to the sixth control signal terminal SC6, a first electrode of the seventh transistor T7 is connected to the third voltage input terminal, and a second electrode of the seventh transistor T7 is connected to the first node N1.

Figure 12:
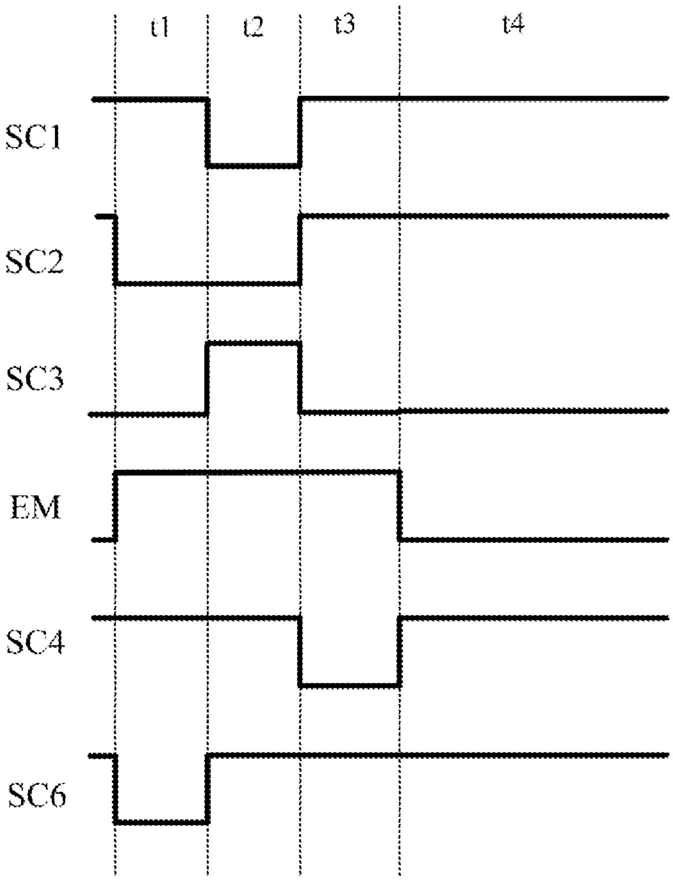
FIG. 12 is a timing diagram illustrating an operation of the pixel driving circuit shown in FIG. 10.

FIG. 12 is a timing diagram illustrating an operation of the pixel driving circuit shown in FIG. 10, and as shown in FIG. 12, the operation of the pixel driving circuit shown in FIG. 10 may include: a reset stage t1, a compensation stage t2, a light emission voltage writing stage t3 and a light emission stage t4. The operation timings of the first control signal terminal SC1, the second control signal terminal SC2, the third control signal terminal SC3 and the fourth control signal terminal SC4 shown in FIG. 12 are the same as the operation timings of the first control signal terminal SC1, the second control signal terminal SC2, the third control signal terminal SC3 and the fourth control signal terminal SC4 shown in FIG. 9. Only the operation timings of the light emission control signal terminal EM and the sixth control signal terminal SC6 at each stage will be described in detail below.

In the reset stage t1, a signal provided by light emission control signal terminal EM is at a high level, and a signal provided by the sixth control signal terminal SC6 is at a low level, so that the seventh transistor T7 is turned on, and the fourth transistor T4 is turned off. The third voltage Vref is written into the first node N1 through the seventh transistor T7 to reset the first node N1.

In the compensation stage t2 and the light emission voltage writing stage t3, the signal provided by the light emission control signal terminal EM is at a high level, and the signal provided by the sixth control signal terminal SC6 is at a high level, so that the seventh transistor T7 is turned off, and the fourth transistor T4 is turned off.

In the light emission stage t4, the signal provided by the light emission control signal terminal EM is at a low level, and the signal provided by the sixth control signal terminal SC6 is at a high level, so that the fourth transistor T4 is turned on, and the seventh transistor T7 is turned off.

Figure 13:
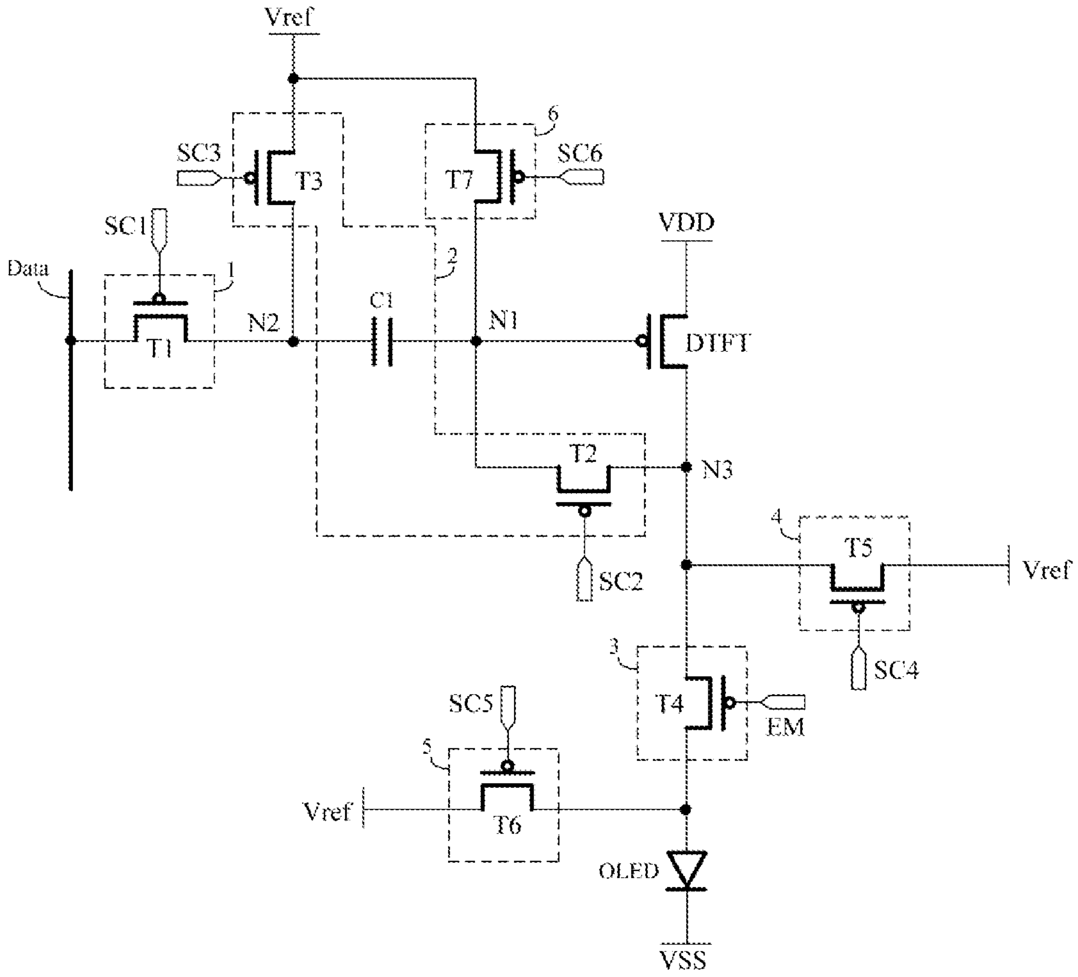
FIG. 13 is a schematic structural diagram of a pixel driving circuit according to an embodiment of the present disclosure.
Figure 14:
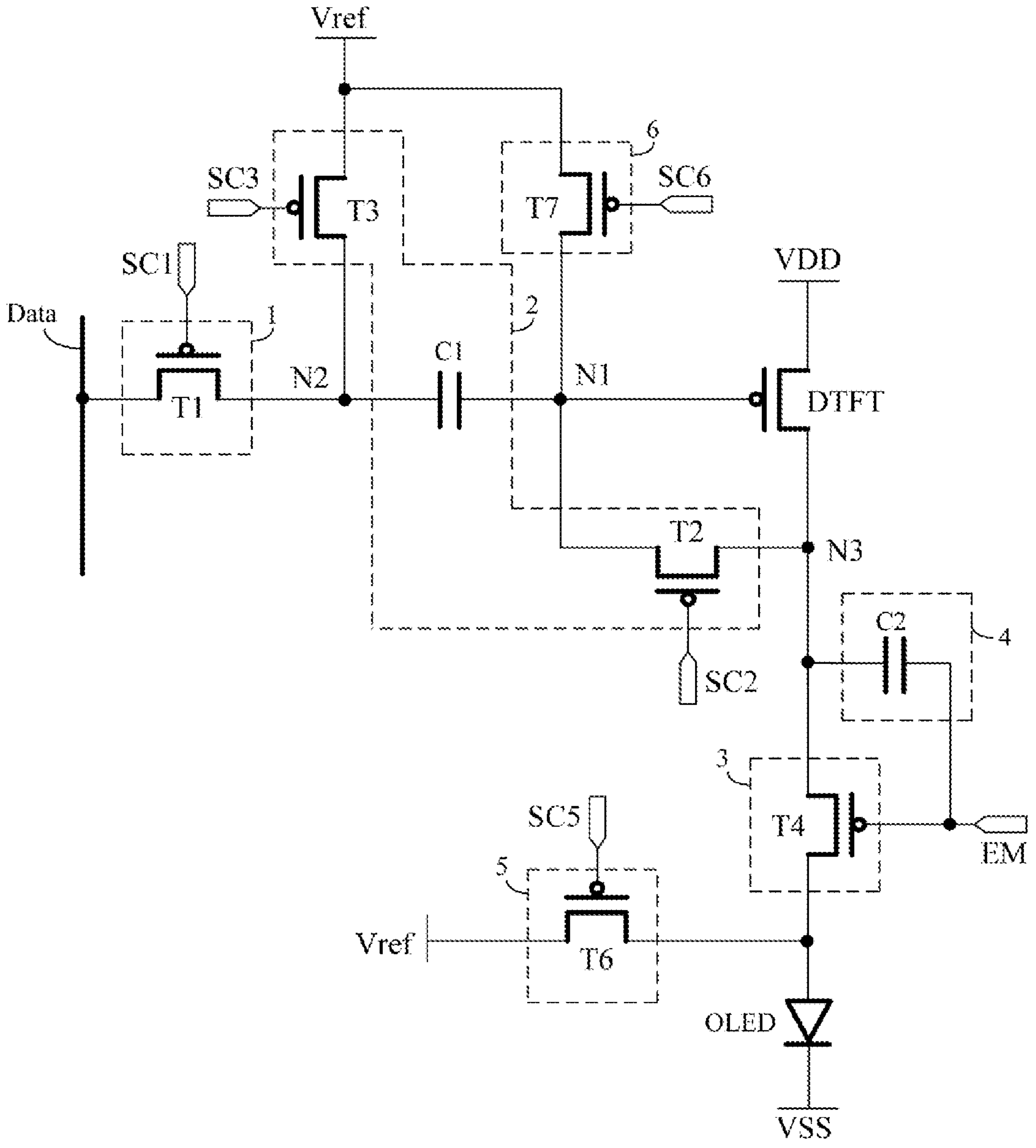
FIG. 14 is a schematic structural diagram of a pixel driving circuit according to an embodiment of the present disclosure.

FIG. 13 is a schematic structural diagram of a pixel driving circuit provided in an embodiment of the present disclosure, and FIG. 14 is a schematic structural diagram of a pixel driving circuit provided in an embodiment of the present disclosure, as shown in FIG. 13 and FIG. 14, in some implementations, the pixel driving circuit includes not only the data writing circuit 1, the compensation control circuit 2, the light emission control circuit 3, and the voltage regulation circuit 4, but also the first reset circuit 5 and the second reset circuit 6.

For the description of the specific circuit structures of the data writing circuit 1, the compensation control circuit 2, the light emission control circuit 3, the voltage regulation circuit 4, the first reset circuit 5 and the second reset circuit 6 in FIG. 13 and FIG. 14, reference may be made to the corresponding contents in the foregoing embodiments, and details are not repeated here. The specific operations of the pixel driving circuits shown in FIGS. 13 and 14 can be seen from the foregoing description of the timing sequences shown in FIGS. 9 and 12.

Figure 15:
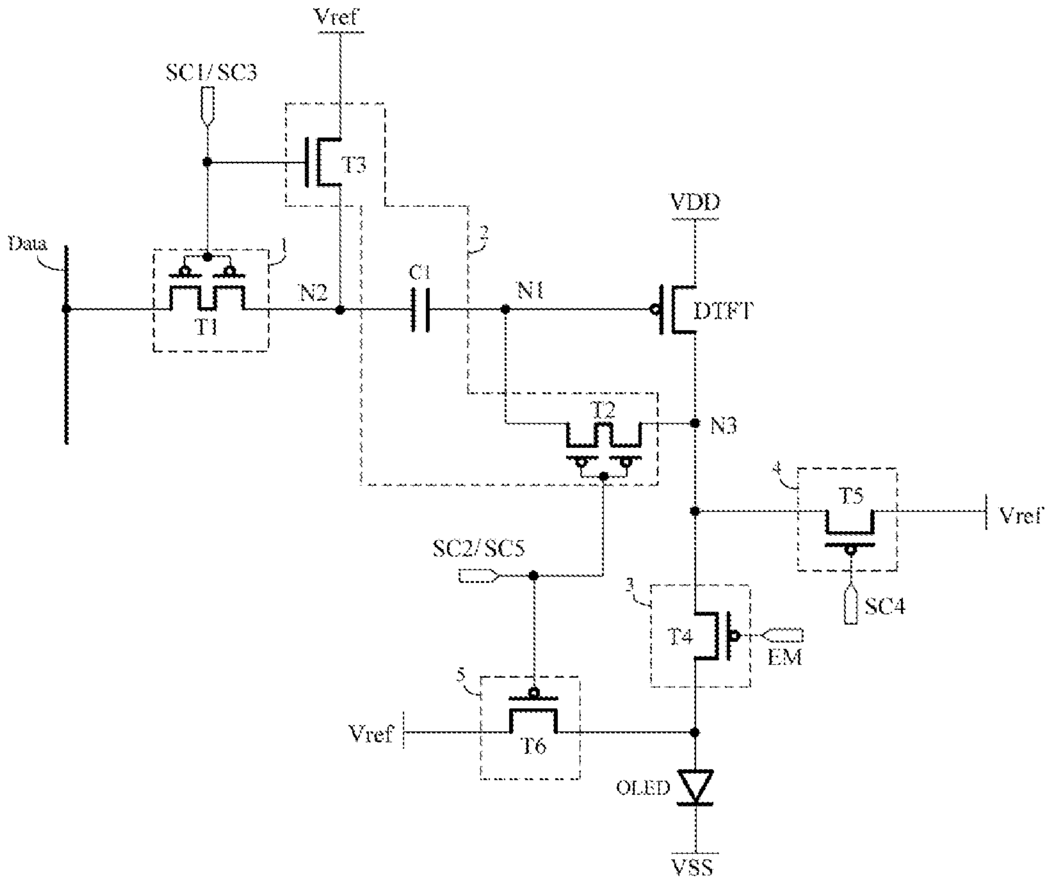
FIG. 15 is a schematic structural diagram of a pixel driving circuit according to an embodiment of the present disclosure.

FIG. 15 is a schematic structural diagram of a pixel driving circuit according to an embodiment of the present disclosure, and as shown in FIG. 15, in some implementations, the first transistor T1 is a dual-gate low temperature polysilicon transistor. The low temperature polysilicon transistor has the characteristic of high response speed, so that the data voltage Vdata can be quickly written into the second node N2 in the compensation stage, and a high requirement of high-resolution products on the data voltage writing speed can be met. Meanwhile, the double-gate structure design of the low temperature polysilicon transistor can effectively reduce the leakage current of the second node N2 through the first transistor T1.

With continued reference to FIG. 15, in some implementations, in a case where the first transistor T1 is a low temperature polysilicon transistor (P-type transistor), the third transistor T3 is an oxide transistor (N-type transistor, which may be specifically a low temperature polycrystalline oxide transistor), and the first control signal terminal SC1 and the third control signal terminal SC3 are a same control signal terminal (i.e., are common to each other). The oxide transistor has a smaller leakage current, which can effectively reduce the leakage current of the second node N2 through the third transistor T3. Meanwhile, the first control signal terminal SC1 and the third control signal terminal SC3 are designed as the same control signal terminal, which can effectively reduce the number of signals to be configured for the pixel driving circuit, and is beneficial to simplifying the product design.

In some implementations, the second transistor T2 and the sixth transistor T6 are low temperature polysilicon transistors, and the second control signal terminal SC2 and the fifth control signal terminal SC5 are a same control signal terminal (i.e., are common to each other). In the present disclosure, the sixth transistor T6 is designed as a low temperature polysilicon transistor, which enables the third voltage Vref to be quickly written into the first electrode of the light emitting device OLED in the reset stage, so the duration of the reset stage can be designed to be relatively short, so as to meet the high requirement of high resolution products on the reset speed; the second transistor T2 is designed as a low temperature polysilicon transistor, so that the threshold voltage of the driving transistor DTFT can be quickly obtained in the compensation stage, and the duration of the compensation stage can be designed to be relatively short, so that the high requirement of a high-resolution product on the compensation speed can be met; meanwhile, the second control signal terminal SC2 and the fifth control signal terminal SC5 are designed as the same control signal terminal, which can effectively reduce the number of signals to be configured for the pixel driving circuit, and is beneficial to simplifying the product design.

Further, considering that the first node N1 is in a floating state in the light emission stage, and the stability of the voltage at the first node N1 directly affects the light emitting effect of the light emitting device OLED, the second transistor T2 connected with the first node N1 may be designed as a double-gate low temperature polysilicon transistor, which can effectively reduce the leakage current of the first node N1 through the second transistor T2.

Figure 16:
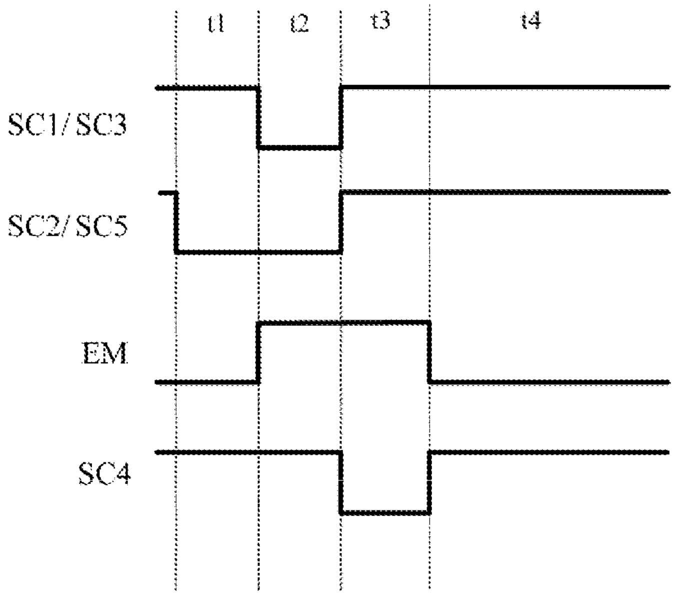
FIG. 16 is a timing diagram illustrating an operation of the pixel driving circuit shown in FIG. 15.

FIG. 16 is a timing diagram illustrating an operation of the pixel driving circuit shown in FIG. 15, and as shown in FIG. 16, the operation of the pixel driving circuit shown in FIG. 16 may include a reset stage t1, a compensation stage t2, a light emission voltage writing stage t3 and a light emission stage t4.

In the reset stage t1, a signal provided by the first control signal terminal SC1 (the third control signal terminal SC3) is at a high level, a signal provided by the second control signal terminal SC2 (the fifth control signal terminal SC5) is at a low level, the signal provided by the light emission control signal terminal EM is at a low level, and a signal provided by the fourth control signal terminal SC4 is at a high level. In this case, the second transistor T2, the third transistor T3, the fourth transistor T4, and the sixth transistor T6 are all turned on, and the first transistor T1 and the fifth transistor T5 are all turned off.

The third voltage Vref is written into the second node N2 through the third transistor T3 to reset the second node N2; the third voltage Vref is written into the first electrode of the light emitting device OLED through the sixth transistor T6 to reset the first electrode of the light emitting device OLED, and is also written into the first node N1 through the fourth transistor T4 and the second transistor T2 to reset the first node N1.

In the compensation stage t2, the signal provided by the first control signal terminal SC1 (the third control signal terminal SC3) is at a low level, the signal provided by the second control signal terminal SC2 (the fifth control signal terminal SC5) is at a low level, the signal provided by the light emission control signal terminal EM is at a high level, and the signal provided by the fourth control signal terminal SC4 is at a high level. In this case, the first transistor T1, the second transistor T2, and the sixth transistor T6 are all turned on, and the third transistor T3, the fourth transistor T4, and the fifth transistor T5 are all turned off.

The data voltage Vdata is written into the second node N2 through the first transistor T1; the first node N1 is charged by the first voltage VDD through the driving transistor DTFT and the second transistor T2, and in a case where the voltage at the first node N1 is equal to VDD+Vth, the driving transistor DTFT is turned off, and the charging is finished; in this case, the voltage difference between two terminals of the coupling capacitor C1 is equal to VDD+Vth−Vdata.

In the light emission voltage writing stage t3, the signal provided by the first control signal terminal SC1 (the third control signal terminal SC3) is at a high level, the signal provided by the second control signal terminal SC2 (the fifth control signal terminal SC5) is at a high level, the signal provided by the light emission control signal terminal EM is at a high level, and the signal provided by the fourth control signal terminal SC4 is at a low level. In this case, the third transistor T3 and the fifth transistor T5 are all turned on, and the first transistor T1, the second transistor T2, the fourth transistor T4, and the sixth transistor T6 are all turned off.

The second transistor T2 is turned off, and the first node N1 is in a floating state. The third voltage Vref is written into the second node N2 through the third transistor T3, the voltage at the second node N2 is changed from Vdata to Vref, and under the bootstrap action of the coupling capacitor C1, the voltage at the first node N1 is changed from VDD+Vth to VDD+Vth+Vref−Vdata. That is, the light emission voltage written into the first node N1 is equal to VDD+Vth+Vref−Vdata.

In the process of writing the light emission voltage into the first node N1, since the fifth transistor T5 is turned on, the third voltage Vref is written into the third node N3 through the fifth transistor T5, the voltage at the third node N3 is always maintained at Vref, that is, the bias stress applied to the driving transistor DTFT is substantially constant, the threshold voltage of the driving transistor DTFT is substantially kept stable, and the influence of the hysteresis effect can be reduced.

In the light emission stage t4, the signal provided by the first control signal terminal SC1 (the third control signal terminal SC3) is at a high level, the signal provided by the second control signal terminal SC2 (the fifth control signal terminal SC5) is at a high level, the signal provided by the light emission control signal terminal EM is at a low level, and the signal provided by the fourth control signal terminal SC4 is at a high level. In this case, the third transistor T3 and the fourth transistor T4 are all turned on, and the first transistor T1, the second transistor T2, the fifth transistor T5, and the sixth transistor T6 are all turned off.

The third transistor T3 continuously writes the third voltage Vref into the second node N2 to maintain the voltage at the second node N2 stable, which is beneficial to maintaining the voltage at the first node N1 stable; meanwhile, the driving transistor DTFT outputs a driving current I according to its own gate-source voltage Vgs.

Figure 17:
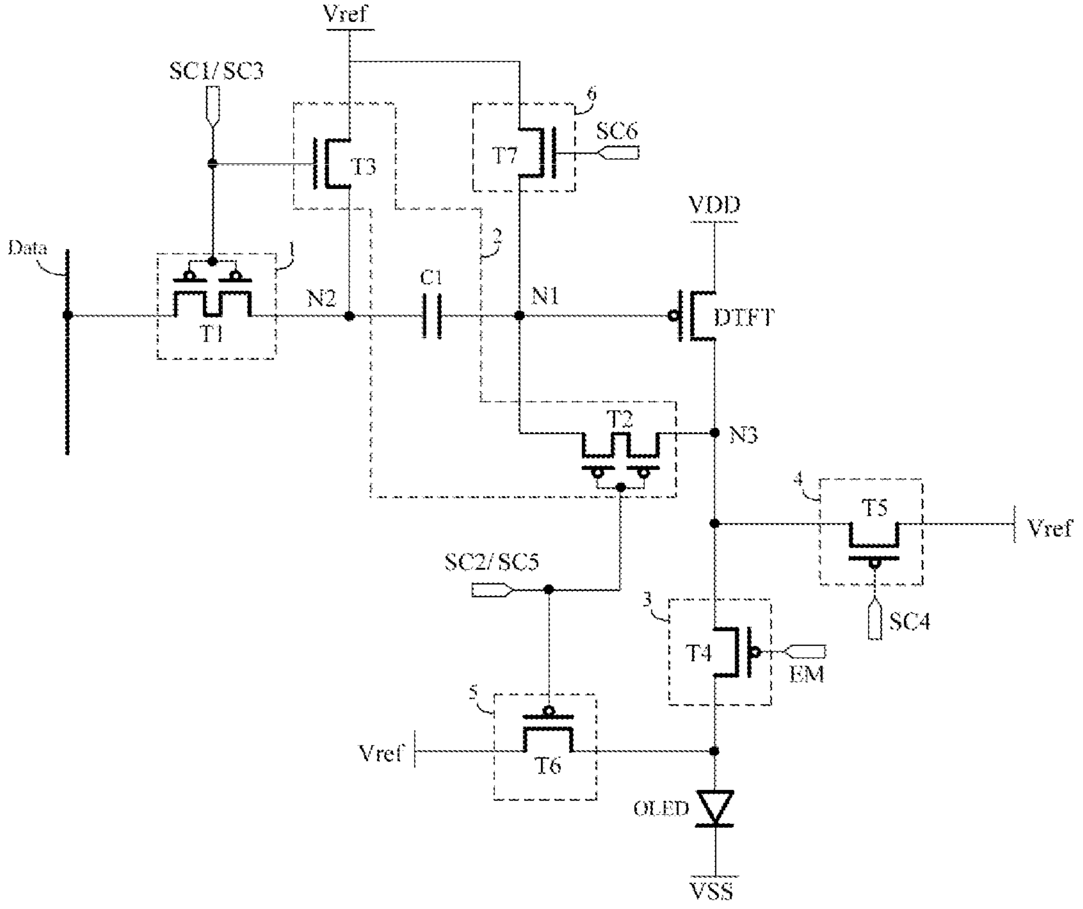
FIG. 17 is a schematic structural diagram of a pixel driving circuit according to an embodiment of the present disclosure.

FIG. 17 is a schematic structural diagram of a pixel driving circuit according to an embodiment of the present disclosure, as shown in FIG. 17, based on the pixel driving circuit shown in FIG. 15, the pixel driving circuit shown in FIG. 17 further includes a second reset circuit 6, and the second reset circuit 6 further includes a seventh transistor T7.

Considering that the first node N1 is in a floating state in the light emission stage, and the stability of the voltage at the first node N1 directly affects the light emitting effect of the light emitting device OLED, the seventh transistor T7 connected to the first node N1 may be designed as an oxide transistor, which can effectively reduce the leakage current of the first node N1 through the second transistor T2.

Figure 18:
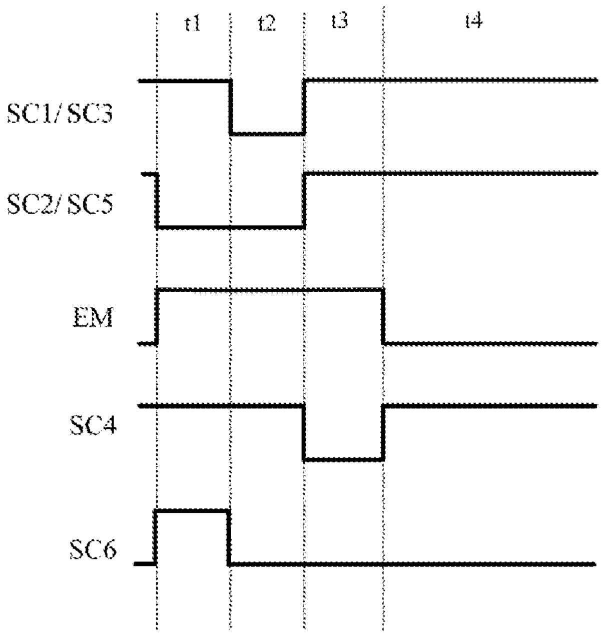
FIG. 18 is a timing diagram illustrating an operation of the pixel driving circuit shown in FIG. 17.

FIG. 18 is a timing diagram illustrating an operation of the pixel driving circuit shown in FIG. 17, and as shown in FIG. 18, the operation timings of the first control signal terminal SC1 (the third control signal terminal SC3), the second control signal terminal SC2 (the fifth control signal terminal SC5) and the fourth control signal terminal SC4 shown in FIG. 18 are the same as the operation timings of the first control signal terminal SC1 (the third control signal terminal SC3), the second control signal terminal SC2 (the fifth control signal terminal SC5) and the fourth control signal terminal SC4 shown in FIG. 16. Only the operation timings of light emission control signal terminal EM and the sixth control signal terminal SC6 at each stage in FIG. 18 will be described in detail below.

In the reset stage t1, the signal provided by the light emission control signal terminal EM is at a high level, and the signal provided by the sixth control signal terminal SC6 is at a high level, so that the seventh transistor T7 is turned on, and the fourth transistor T4 is turned off. The third voltage Vref is written into the first node N1 through the seventh transistor T7 to reset the first node N1.

In the compensation stage t2 and the light emission voltage writing stage t3, the signal provided by the light emission control signal terminal EM is at a high level, and the signal provided by the sixth control signal terminal SC6 is at a low level, so that the seventh transistor T7 is turned off, and the fourth transistor T4 is turned off.

In the light emission stage t4, the signal provided by the light emission control signal terminal EM is at a low level, and the signal provided by the sixth control signal terminal SC6 is at a low level, so that the fourth transistor T4 is turned on, and the seventh transistor T7 is turned off.

Figure 19:
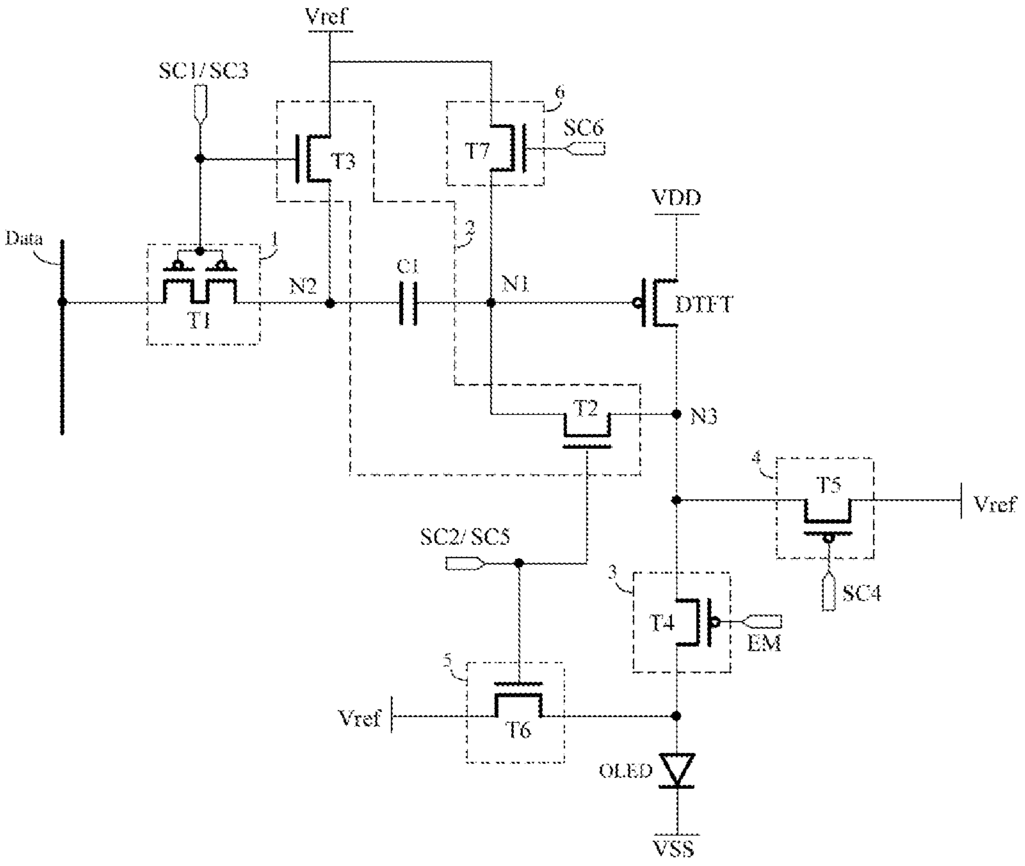
FIG. 19 is a schematic structural diagram of a pixel driving circuit according to an embodiment of the present disclosure.

FIG. 19 is a schematic structural diagram of a pixel driving circuit according to an embodiment of the present disclosure, and as shown in FIG. 19, unlike the second transistor T2 and the sixth transistor T6 shown in FIG. 15 which are both low-temperature polysilicon transistors, the second transistor T2 and the sixth transistor T6 shown in FIG. 17 are both oxide transistors, which can effectively reduce the leakage current of the first node N1 through the second transistor T2 and reduce the leakage current of the first electrode of the light emitting device OLED through the sixth transistor T6.

Figure 20:
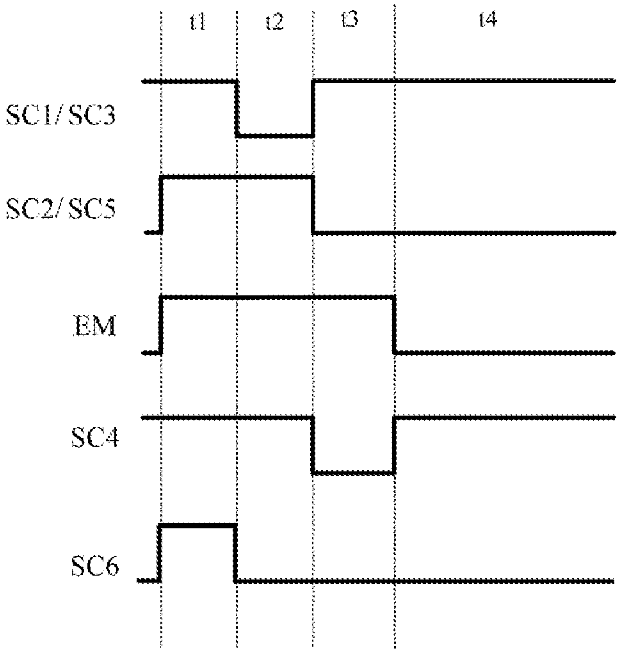
FIG. 20 is a timing diagram illustrating an operation of the pixel driving circuit shown in FIG. 19.

FIG. 20 is a timing diagram illustrating an operation of the pixel driving circuit shown in FIG. 19, and as shown in FIG. 20, the operation timings of the first control signal terminal SC1 (the third control signal terminal SC3), the fourth control signal terminal SC4 and light emission control signal terminal EM shown in FIG. 20 are the same as the operation timings of the first control signal terminal SC1 (the third control signal terminal SC3), the fourth control signal terminal SC4 and light emission control signal terminal EM shown in FIG. 16; the level states of the second control signal terminal SC2 (the fifth control signal terminal SC5) in respective stages shown in FIG. 20 are opposite to the level states of the second control signal terminal SC2 (the fifth control signal terminal SC5) in respective stages shown in FIG. 16, and detailed operation process thereof is not described herein.

Each of the regulation circuits in FIGS. 15, 17 and 19 may be not the fifth transistor T5 but the regulation capacitor C2 in the previous embodiments, and no drawing corresponding thereto is shown.

It should be noted that, each transistor in the pixel driving circuit provided in the foregoing embodiments may be independently selected from an N-type transistor or a P-type transistor, and technical solutions obtained by simply changing the type of the transistor and the timing sequence corresponding thereto also fall within the protective scope of the present disclosure. In addition, in all the embodiments described above, different technical features may be combined with each other, and a new technical solution obtained by combining the technical features also shall fall within the protective scope of the present disclosure.

Figure 21:
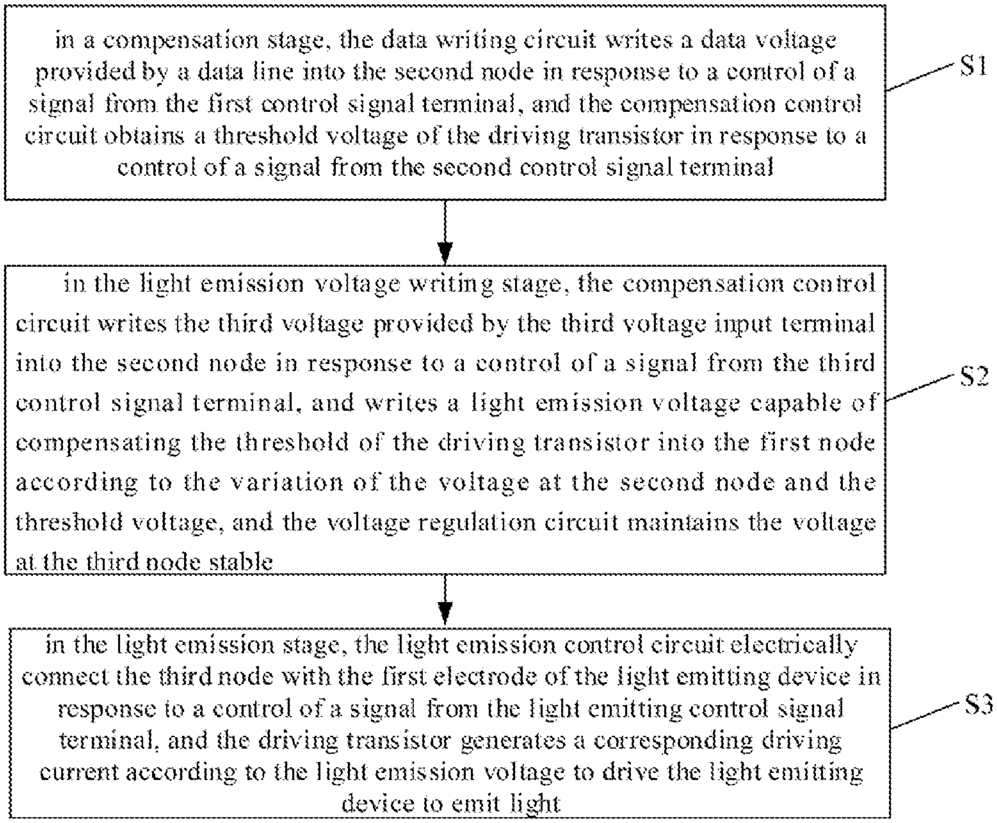
FIG. 21 is a flowchart of a driving method of a pixel driving circuit according to an embodiment of the present disclosure.

Based on the same inventive concept, an embodiment of the present disclosure further provides a driving method of the pixel driving circuit. FIG. 21 is a flowchart of the driving method of the pixel driving circuit according to an embodiment of the present disclosure, and as shown in FIG. 21, the pixel driving circuit is any pixel driving circuit provided in the foregoing embodiments, and for specific description of the pixel driving circuit, reference may be made to the contents in the foregoing embodiments, which is not repeated herein, and the driving method includes steps S1 to S3.

In step S1, in a compensation stage, the data writing circuit writes a data voltage provided by a data line into the second node in response to the control of a signal from the first control signal terminal, and the compensation control circuit obtains a threshold voltage of the driving transistor in response to the control of a signal from the second control signal terminal.

In step S2, in the light emission voltage writing stage, the compensation control circuit writes the third voltage provided by the third voltage input terminal into the second node in response to the control of a signal from the third control signal terminal, and writes a light emission voltage capable of compensating the threshold voltage of the driving transistor into the first node according to the variation of the voltage at the second node and the threshold voltage, and the voltage regulation circuit maintains the voltage at the third node stable.

In step S3, in the light emission stage, the light emission control circuit electrically connect the third node with the first electrode of the light emitting device in response to the control of a signal from the light emitting control signal terminal, and the driving transistor generates a corresponding driving current according to the light emission voltage to drive the light emitting device to emit light.

For the detailed description of the steps S1 to S3, reference may be made to the contents in the foregoing embodiments, and details thereof are not repeated here.

In the embodiment of the present disclosure, by arranging the voltage regulation circuit at the third node in the pixel driving circuit, the voltage regulation circuit can weaken, even completely eliminate the influence of the parasitic capacitance between the gate and the drain of the driving transistor on the voltage at the drain of the driving transistor in the process of writing the light emission voltage into the gate of the driving transistor by the compensation control circuit, so as to maintain the stability of the voltage at the third node, thereby enabling the bias stress applied to the driving transistor to be substantially constent, enabling the threshold voltage of the driving transistor to be substantially kept stable, therefore, the influence of the hysteresis effect can be weakened, and further the problems of ghost and flicker of the display device can be effectively improved.

Based on the same inventive concept, an embodiment of the present disclosure further provides a display substrate, including: any one of the pixel driving circuits provided in the foregoing embodiments, and for the specific description of the pixel driving circuit, reference may be made to the contents in the foregoing embodiments, and details thereof are not described here again.

An embodiment of the present disclosure further provides a display device, including: the display substrate provided by the previous embodiment.

The display device in the embodiment of the present disclosure may be any product or component with a display function, such as electronic paper, an OLED panel, a mobile phone, a tablet computer, a television, a display, a notebook computer, a digital photo frame and a navigator.

It will be understood that the above embodiments are merely exemplary embodiments employed to illustrate the principles of the present disclosure, and the present disclosure is not limited thereto. It will be apparent to those skilled in the art that various improvements and modifications can be made therein without departing from the spirit and scope of the present disclosure, and these improvements and modifications are to be considered within the protective scope of the present disclosure.

What is claimed is:

1. A pixel driving circuit, comprising: a data writing circuit, a compensation control circuit, a light emission control circuit, a voltage regulation circuit, a first reset circuit and a driving transistor, wherein the compensation control circuit is connected with a gate of the driving transistor at a first node, the compensation control circuit is connected with the data writing circuit at a second node, and the compensation control circuit, the light emission control circuit, the voltage regulation circuit are connected with a second electrode of the driving transistor at a third node;

the data writing circuit is connected with a first control signal terminal and a data line, and is configured to write a data voltage provided by the data line into the second node in response to a control of a signal from the first control signal terminal;

the light emission control circuit is connected with a light emission control signal terminal and a first electrode of a light emitting device, and is configured to control an electrical connection/disconnection of the third node with/from the first electrode of the light emitting device in response to a control of a signal from the light emission control signal terminal;

the compensation control circuit is connected with a second control signal terminal, a third control signal terminal and a third voltage input terminal, and is configured to obtain a threshold voltage of the driving transistor in response to a control of a signal from the second control signal terminal, write a third voltage provided by the third voltage input terminal into the second node in response to a control of a signal from the third control signal terminal, and write a light emission voltage capable of compensating the threshold voltage of the driving transistor into the first node according to a variation in a voltage at the second node and the threshold voltage;

the voltage regulation circuit is configured to maintain a voltage at the third node stable during the compensation control circuit writing the light emission voltage into the first node;

a first electrode of the driving transistor is connected with a first voltage input terminal, and is configured to generate a corresponding driving current according to the light emission voltage, and the first reset circuit is connected to a fifth control signal terminal, the third voltage input terminal, and the first electrode of the light emitting device, and is configured to write a third voltage supplied from the third voltage input terminal into the first electrode of the light emitting device in response to a control of a signal from the fifth control signal terminal.

2. The pixel driving circuit of claim 1, wherein the voltage regulation circuit comprises a fifth transistor, and a control electrode of the fifth transistor is connected to a fourth control signal terminal, a first electrode of the fifth transistor is connected to the third node, and a second electrode of the fifth transistor is connected to a third voltage input terminal.

3. The pixel driving circuit of claim 2, wherein the data writing circuit comprises a first transistor;

a control electrode of the first transistor is connected to the first control signal terminal, a first electrode of the first transistor is connected to the data line, and a second electrode of the first transistor is connected to the second node.

4. The pixel driving circuit of claim 1, wherein the voltage regulation circuit comprises a voltage regulation capacitor;

a first terminal of the voltage regulation capacitor is connected with the third node, and a second terminal of the voltage regulation capacitor is connected with a fourth voltage input terminal.

5. The pixel driving circuit of claim 4, wherein the fourth voltage input terminal is common to the light emission control signal terminal.

6. The pixel driving circuit of claim 1, wherein the data writing circuit comprises a first transistor;

a control electrode of the first transistor is connected to the first control signal terminal, a first electrode of the first transistor is connected to the data line, and a second electrode of the first transistor is connected to the second node.

7. The pixel driving circuit of claim 6, wherein the first transistor is a dual-gate low temperature polysilicon transistor.

8. The pixel driving circuit of claim 1, wherein the reset compensation control circuit comprises: a second transistor, a third transistor and a coupling capacitor;

a control electrode of the second transistor is connected with the second control signal terminal, a first electrode of the second transistor is connected with the first node, and a second electrode of the second transistor is connected with the third node;

a control electrode of the third transistor is connected to the third control signal terminal, a first electrode of the third transistor is connected to the third voltage input terminal, and a second electrode of the third transistor is connected to the second node; and a first terminal of the coupling capacitor is connected with the first node, and a second terminal of the coupling capacitor is connected with the second node.

9. The pixel driving circuit of claim 8, wherein the data writing circuit comprises a first transistor;

a control electrode of the first transistor is connected with the first control signal terminal, a first electrode of the first transistor is connected with the data line, and a second electrode of the first transistor is connected with the second node;

the first transistor is a low temperature polysilicon transistor, and the third transistor is an oxide transistor; and the first control signal terminal and the third control signal terminal are common to each other.

10. The pixel driving circuit of claim 8, wherein the first reset circuit comprises a sixth transistor;

a control electrode of the sixth transistor is connected with a fifth control signal terminal, a first electrode of the sixth transistor is connected to the first electrode of the light emitting device, and a second electrode of the sixth transistor is connected to the third voltage input terminal;

the second transistor and the sixth transistor are both low temperature polysilicon transistors or both oxide transistors; and the second control signal terminal and the fifth control signal terminal are common to each other.

11. The pixel driving circuit of claim 8, wherein the first transistor is a dual-gate low temperature polysilicon transistor.

12. The pixel driving circuit of claim 1, wherein the light emission control circuit comprises a fourth transistor;

a control electrode of the fourth transistor is connected to the light emission control signal terminal, a first electrode of the fourth transistor is connected to the third node, and a second electrode of the fourth transistor is connected to the first electrode of the light emitting device.

13. The pixel driving circuit of claim 1, wherein the first reset circuit comprises a sixth transistor, and a control electrode of the sixth transistor is connected to the fifth control signal terminal, a first electrode of the sixth transistor is connected to the first electrode of the light emitting device, and a second electrode of the sixth transistor is connected to the third voltage input terminal.

14. The pixel driving circuit of claim 1, further comprising: a second reset circuit, wherein the second reset circuit is connected to a sixth control signal terminal, the third voltage input terminal, and the first node, and is configured to write the third voltage provided from the third voltage input terminal into the first node in response to a control of a signal from the sixth control signal terminal.

15. The pixel driving circuit of claim 14, wherein the second reset circuit comprises a seventh transistor, wherein a control electrode of the seventh transistor is connected to the sixth control signal terminal, a first electrode of the seventh transistor is connected to the third voltage input terminal, and a second electrode of the seventh transistor is connected to the first node.

16. The pixel driving circuit of claim 15, wherein the seventh transistor is an oxide transistor.

17. A driving method of the pixel driving circuit of claim 1, comprising:

a compensation stage, in which the data writing circuit writes a data voltage provided by the data line into the second node in response to a control of a signal from the first control signal terminal, and the compensation control circuit obtains a threshold voltage of the driving transistor in response to a control of a signal from the second control signal terminal;

a light emission voltage writing stage, in which the compensation control circuit writes a third voltage provided by the third voltage input terminal into the second node in response to a control of a signal from the third control signal terminal, and writes a light emission voltage capable of compensating the threshold voltage of the driving transistor into the first node according to a variation in a voltage at the second node and the threshold voltage, and the voltage regulation circuit maintains the voltage at the third node stable; and a light emission stage, in which the light emission control circuit electrically connect/disconnect the third node with/from the first electrode of the light emitting device in response to a control of a signal from the light emitting control signal terminal, and the driving transistor generates a corresponding driving current according to the light emission voltage so as to drive the light emitting device to emit light.

18. A display substrate, comprising: the pixel driver circuit of claim 1.

19. A display device, comprising: the display substrate of claim 18.

* * * * *